(12) United States Patent
Jackson et al.

(10) Patent No.: US 7,669,297 B2
(45) Date of Patent: Mar. 2, 2010

(54) COMPOSITE WEBS AND CLOSURE SYSTEMS

(75) Inventors: Byron M. Jackson, Forest Lake, MN (US); Leigh E. Wood, Woodbury, MN (US); Randall L. Alberg, Maplewood, MN (US); Dennis L. Becker, Vadnais Heights, MN (US); Roger D. Pavlis, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/675,133

(22) Filed: Feb. 15, 2007

(65) Prior Publication Data

US 2007/0141300 A1    Jun. 21, 2007

Related U.S. Application Data

(60) Division of application No. 10/744,141, filed on Dec. 22, 2003, now Pat. No. 7,195,729, which is a continuation-in-part of application No. 10/387,699, filed on Mar. 13, 2003, now Pat. No. 7,238,314.

(51) Int. Cl.
*A44B 18/00*    (2006.01)

(52) U.S. Cl. .................... 24/442; 24/447; 24/448; 428/99; 428/100

(58) Field of Classification Search .......... None
See application file for complete search history.

(56) References Cited

U.S. PATENT DOCUMENTS

| | | | |
|---|---|---|---|
| 2,919,467 A | 1/1960 | Mercer |
| 3,085,292 A | 4/1963 | Kindseth |
| 3,276,944 A | 10/1966 | Levy |
| 3,338,992 A | 8/1967 | Kinney |
| 3,341,394 A | 9/1967 | Kinney |
| 3,386,876 A | 6/1968 | Wyckoff |
| 3,394,431 A | 7/1968 | Nalle, Jr. |
| 3,502,538 A | 3/1970 | Petersen |
| 3,502,763 A | 3/1970 | Hartmann |
| 3,505,157 A | 4/1970 | Fields et al. |
| 3,515,778 A | 6/1970 | Fields et al. |
| 3,542,615 A | 11/1970 | Dobo et al. |
| 3,632,269 A | 1/1972 | Doviak et al. |
| 3,666,609 A | 5/1972 | Kalwaites et al. |
| 3,692,618 A | 9/1972 | Dorschner et al. |
| 3,881,381 A | 5/1975 | Kalwaites |
| 3,899,803 A | 8/1975 | Brumlik |
| 3,913,510 A | 10/1975 | Larsen |
| 4,062,995 A | 12/1977 | Korpman |
| 4,183,121 A | 1/1980 | Cousins |
| 4,223,059 A | 9/1980 | Schwarz |

(Continued)

FOREIGN PATENT DOCUMENTS

EP    0 096 458    12/1983

(Continued)

*Primary Examiner*—Jack W. Lavinder

(57) ABSTRACT

Composite webs having one or more polymeric structures located on a substrate, closure systems comprising composite webs, and methods of attaching articles are disclosed. The polymeric structures are formed using thermoplastic compositions and are attached to a surface of a substrate. The polymeric structures include an area that is attached to the substrate and a detached area that is not attached to a surface of a substrate.

17 Claims, 19 Drawing Sheets

U.S. PATENT DOCUMENTS

| | | |
|---|---|---|
| 4,329,309 A | 5/1982 | Kelly |
| 4,340,563 A | 7/1982 | Appel et al. |
| 4,381,326 A | 4/1983 | Kelly |
| 4,573,991 A | 3/1986 | Pieniak et al. |
| 4,661,389 A | 4/1987 | Mudge et al. |
| 4,753,838 A | 6/1988 | Kimura et al. |
| 4,842,596 A | 6/1989 | Kielpikowski et al. |
| 4,887,339 A | 12/1989 | Bellanger |
| 4,935,287 A | 6/1990 | Johnson et al. |
| 4,965,122 A | 10/1990 | Morman |
| 4,981,747 A | 1/1991 | Morman |
| 5,019,071 A | 5/1991 | Bany et al. |
| 5,028,646 A | 7/1991 | Miller et al. |
| 5,114,781 A | 5/1992 | Morman |
| 5,116,662 A | 5/1992 | Morman |
| 5,167,897 A | 12/1992 | Weber et al. |
| 5,226,992 A | 7/1993 | Morman |
| 5,300,057 A | 4/1994 | Miller et al. |
| 5,389,438 A | 2/1995 | Miller et al. |
| 5,462,708 A | 10/1995 | Swenson et al. |
| 5,501,679 A | 3/1996 | Krueger et al. |
| 5,531,729 A | 7/1996 | Coles et al. |
| 5,576,090 A | 11/1996 | Suzuki |
| 5,647,864 A * | 7/1997 | Allen et al. ................. 604/391 |
| 5,671,511 A * | 9/1997 | Hattori et al. ................. 24/444 |
| 5,792,411 A | 8/1998 | Morris et al. |
| 5,885,686 A | 3/1999 | Cederblad et al. |
| 5,953,797 A | 9/1999 | Provost et al. |
| 5,983,467 A | 11/1999 | Duffy |
| 6,054,091 A | 4/2000 | Miller et al. |
| 6,074,505 A * | 6/2000 | Ouellette et al. ............ 156/148 |
| 6,090,234 A | 7/2000 | Barone et al. |
| 6,093,663 A | 7/2000 | Ouellette et al. |
| 6,190,594 B1 | 2/2001 | Gorman et al. |
| 6,261,278 B1 | 7/2001 | Chen et al. |
| 6,340,782 B1 | 1/2002 | Kling et al. |
| 6,406,466 B1 | 6/2002 | Pozniak et al. |
| 7,195,729 B2 | 3/2007 | Jackson et al. |
| 2002/0190418 A1 | 12/2002 | Jens et al. |
| 2003/0084996 A1 | 5/2003 | Alberg et al. |
| 2003/0085485 A1 | 5/2003 | Seidel et al. |
| 2003/0087059 A1 | 5/2003 | Jackson et al. |
| 2003/0087098 A1 | 5/2003 | Eaton et al. |

FOREIGN PATENT DOCUMENTS

| | | |
|---|---|---|
| EP | 0 580 073 | 1/1994 |
| EP | 0 830 930 | 3/1998 |
| EP | 0 892 320 | 1/1999 |
| WO | WO 96/10481 | 4/1996 |
| WO | WO 99/10166 | 3/1999 |
| WO | WO 00/07532 | 2/2000 |
| WO | WO 00/50229 | 8/2000 |
| WO | WO 00/59326 | 10/2000 |
| WO | WO 01/47697 | 7/2001 |
| WO | WO 02/00412 | 1/2002 |

* cited by examiner

COMPOSITE WEBS AND CLOSURE SYSTEMS

RELATED APPLICATION

This application is a divisional of U.S. Ser. No. 10/744,141, filed Dec. 22, 2003, now allowed, the disclosure of which is incorporated by reference in its entirety herein and which was a continuation-in-part of U.S. patent application Ser. No. 10/387,699, filed Mar. 13, 2003.

FIELD OF THE INVENTION

The present invention relates to composite webs that include one or more polymeric structures on a substrate, as well as methods and systems for manufacturing the composite webs.

BACKGROUND

The manufacture of articles formed of webs that require some reinforcement to withstand forces experienced during use are known. In many cases, reinforcement is simply provided over the entire substrate or web. Such approaches can, however, add cost and weight to the web, as well as stiffness over the entire surface of the web—even in those areas that do not require reinforcement. Furthermore, reinforcing layers that are coextensive with the web may also reduce its breathability.

To address some of these issues, smaller pieces of reinforcing materials may be attached to a web or substrate in selected areas that require reinforcement. The handling and attachment of such discrete pieces can, however, be problematic, by potentially reducing throughput, causing waste (where the discrete pieces are not securely attached), requiring precise registration or location on the web, requiring the use of adhesives or other bonding agents, etc. The discrete pieces may also present relatively sharp edges that may be the source of irritation or discomfort. The irritation or discomfort can be exacerbated because the reinforcing pieces are typically located on the surface of the substrate.

In addition to (or in place of) reinforcing substrates or webs, it may also be desirable to manufacture articles that exhibit elasticity. The manufacture of articles that exhibit elasticity, i.e., the ability to at least partially recover their original shape after moderate elongation, may be desired for a number of reasons. For example, elasticity may be useful in connection with fastening systems for items such as garments (e.g., diapers, training pants, gowns, bedding, etc.). Elasticity in garments can provide what may be referred to as dynamic fit, i.e., the ability to stretch and recover in response to movement by the wearer.

Elasticity may also be useful in connection with other applications. For example, some fasteners may provide more consistent attachment if the fastener is held in tension that can be supplied by stretching the fastener and relying on the recovery forces to provide the desired tension. In other instances, elasticity may allow for easy adjustment of the size or length of a fastener or other article.

Although elasticity may be beneficial in a variety of different applications, it may raise issues in manufacturing. Many attempts to provide elasticity rely on separate elastic components that are, e.g., glued or sewn to a backing or other nonelastic member to provide the desired elasticity. The manufacture of such composite articles may be problematic in that secure attachment of the elastic components may be difficult to achieve and/or maintain. Further, the cost and difficulty of providing and attaching separate elastic components may be relatively high. The handling and attachment of separate elastic components can reduce throughput, cause additional waste (where the separate components are not securely attached), etc.

In other instances, an entire article may be constructed to provide the desired elasticity. For example, many elastic fastening systems rely on the use of elastic laminate backings in which the elastic materials are provided in the form of a film that is coextensive with the backing. Such an approach may add costs associated with providing a coextensive elastic layer or layers. Further, many elastic materials are not breathable. If the elastic laminate backings are to be used in garments, it may be desirable to perforate the backing to improve its breathability. Such additional processing does, however, add to the cost of producing the elastic laminate backing. Another potential disadvantage of elastic laminate backings is that it may be difficult to provide any adjustment of the elastic recovery forces generated in different portions of the backing.

While a variety of approaches to providing discrete polymeric structures on substrates are disclosed in, e.g., U.S. Patent Application Publication No. U.S. 2003/0085485 A1, filed 5 Nov. 2001 and titled SYSTEMS AND METHODS FOR COMPOSITE WEBS WITH STRUCTURED DISCRETE POLYMERIC REGIONS; U.S. Patent Application Publication No. U.S. 2003/0087098 A1, filed 5 Nov. 2001 and titled COMPOSITE WEBS WITH REINFORCING POLYMERIC REGIONS AND ELASTIC POLYMERIC REGIONS; U.S. Patent Application Publication No. U.S. 2003/0084996 A1, filed 5 Nov. 2001 and titled METHODS FOR PRODUCING COMPOSITE WEBS WITH REINFORCING DISCRETE POLYMERIC REGIONS; and U.S. Patent Application Publication No. U.S. 2003/0087059 A1, filed 5 Nov. 2001 and titled COMPOSITE WEBS WITH DISCRETE ELASTIC POLYMERIC REGIONS, these approaches may be limited in certain aspects, such as in roll temperatures, the composition of substrates, etc.

Closure elements and systems providing attaching means are well known. The art provides a large number of various systems comprising various designs and materials. For example, U.S. Pat. No. 3,899,803 teaches a self gripping device which includes a sheet member including gripping elements having distinct gripping means integrally formed therein within a frame in substantially the same plane as the sheet. To be used as gripping elements the sheet is bent to force the gripping elements to project perpendicular to the plane of the sheet.

Additionally, U.S. Pat. No. 5,983,467 teaches an interlocking device which is generally effectuated by one or more islands on the surface of a first portion which, when a relative shearing force is applied, slidingly engage one or more complementary apertures within a structure on the surface of a second portion. U.S. Pat. No. 4,887,339 teaches a strip of polymeric sheet material adapted to cut into lengths to form releasably engageable pieces of a fastener. U.S. Pat. No. 4,183,121 teaches a separable fastener composed of two opposed, mating elongated strips with a series of flexible interengaging tongues offset from and in parallel alignment with one of the axes of the strips, and partially overlapping openings in the strips.

Despite the significant amount of art regarding closure elements and systems, there is still a need for a closure system such as one that provides low profile, in-plane closure elements at a low cost. Such closure systems could be advantageously used for items such as, but not limited to, packaging and disposable diapers.

SUMMARY OF THE INVENTION

The present invention provides composite webs having one or more polymeric structures located on a substrate, composite webs, methods of manufacturing the composite webs, and systems for manufacturing the composite webs, as well as closure systems including composite webs, and methods of attaching articles.

Composite webs having one or more polymeric structures may be attached to a substrate such that, for example, a structure may be provided that includes both bonded areas and detached areas. Such structures may advantageously provide closure elements and closure systems that may provide closure by, e.g., engaging with fibers of a loop material, engaging with a loop-like material provided by extrusion processes described herein, by a self-mating design as described herein, etc.

The polymeric structures are formed using thermoplastic compositions. As used in connection with the present invention, "thermoplastic" (and variations thereof) means a polymer or polymeric composition that softens when exposed to heat and returns to its original condition or near its original condition when cooled to room temperature. The thermoplastic compositions used in connection with the methods of the present invention should be capable of flowing or entering into depressions in a forming tool as described herein.

Suitable thermoplastic compositions are those that are melt processable. Such polymers are those that will flow sufficiently to at least partially fill the depressions, yet not significantly degrade during a melt process. A wide variety of thermoplastic compositions have suitable melt and flow characteristics for use in the process of the present invention depending on the geometry of the depressions and the processing conditions. It may further be preferred that the melt processable materials and conditions of processing are selected such that any viscoelastic recovery properties of the thermoplastic compositions do not cause them to significantly withdraw from the depressions during wiping of the molten thermoplastic composition as described herein.

In the methods and systems, the forming tool used to form and transfer the one or more polymeric structures to the substrate is maintained at a roll temperature that is below the melt processing temperature of the thermoplastic composition. The melt processing temperature of the thermoplastic compositions of the present invention is the lowest temperature at which the thermoplastic composition is capable of flowing or entering into depressions in a forming tool (as described herein) within a period of five seconds or less.

In some instances, the melt processing temperature may be at or slightly above the glass transition temperature for an amorphous thermoplastic composition or at or slightly above the melting temperature for a crystalline or semicrystalline thermoplastic composition. If the thermoplastic composition includes one or more amorphous polymers blended with either or both of one or more crystalline and one or more semicrystalline polymers, then the melt processing temperature is the higher of the highest glass transition temperature of the amorphous polymers or the highest melting temperature of the crystalline and semicrystalline polymers. In addition, it may be preferred that the roll temperature be at least 20° Celsius or more below the temperature of the molten thermoplastic composition deposited on the forming tool.

One potential advantage of maintaining a relatively cool forming tool is that the molten thermoplastic composition applied to the forming tool (either on its cylindrical outer surface or within depressions formed therein) is that the molten thermoplastic composition in direct contact with the exterior roll surface falls below the melt processing temperature of the thermoplastic composition such that it may at least partially freeze or solidify, while at least a portion of the molten thermoplastic composition located distal from the exterior roll surface remains molten long enough to effect transfer of the thermoplastic composition to form the polymeric structures. The result is that the molten thermoplastic composition distal from the exterior roll surface is capable of attaching to a substrate, while the frozen or solidified thermoplastic composition in contact with the exterior roll surface releases from that surface cleanly.

Another potential advantage of maintaining a relatively cool forming tool is that the composition of the substrates to which the molten thermoplastic composition is transferred is not limited by the forming tool temperature. For example, the roll temperature may be low enough to limit any significant damage to the substrate during the transfer process. As such, the polymeric structures may be formed on porous and non-porous substrates (such as films) that have the same or similar thermoplastic composition as the polymeric structures. In some instances involving substrates formed of thermoplastic compositions themselves, the substrate thermoplastic composition may preferably have a melt processing temperature that is at or below the melt processing temperature of the thermoplastic composition used in the polymeric structures formed thereon. The melt processing temperature of the substrate thermoplastic compositions is subject to the same definition provided above in connection with the thermoplastic compositions used to form the polymeric structures. In addition, it may be preferred that the roll temperature be at least 20° Celsius or more below the melt processing temperature of the substrate thermoplastic composition.

Concerns regarding the internal cohesive strength of the substrate and/or the tensile strength of the substrate may be of more concern if the substrate includes a fibrous construction (e.g., woven, nonwoven, or knit fibers) that could be separated from the remainder of the substrate by the forces exerted when the substrate is pulled away from the forming tool. These considerations may be limited by the present invention because of the freezing or solidification of the thermoplastic composition in the depressions. That freezing or solidification can limit any forces exerted on the substrate as the substrate and the polymeric structures are removed from the forming tool.

Another potential advantage of the methods of the present invention is the ability to transfer one or more polymeric structures onto a major surface of a substrate while a portion of the thermoplastic composition facing the substrate is molten. If the substrate is porous, fibrous, etc., pressure may enhance attachment of the one or more polymeric structures to the substrate by forcing a portion of the thermoplastic composition to infiltrate the substrate and/or encapsulate fibers of the substrate. If the substrate is not porous, but is made with a thermoplastic composition that has a melt processing temperature sufficiently low relative to the temperature of the molten thermoplastic composition in the depressions, then attachment of the polymeric structures may be achieved by intermixing of the thermoplastic compositions in the polymeric structures and the substrate.

Another potential advantage of the present invention is the opportunity to provide polymer structures that include surface features formed on their upper surfaces (i.e., the surfaces facing away from the substrate). The surface features may be, e.g., stems, hooks, pyramids, channels, indicia (alphanumeric or otherwise), etc. and may provide additional functionality such as, e.g., mechanical fastening, etc. These surface features may be provided in an integral process step at the same time as formation and transfer of the polymer structures themselves (as opposed to a separate, subsequent process step). Alternatively, though, the surface features could be provided after formation of the polymer structures.

Another potential advantage is the ability to control the shape, spacing, and volume of the one or more polymeric structures. In some instances, it may be preferred that a plurality of polymeric structures be provided on the first major surface of the substrate, with each of the polymeric structures being discrete polymeric structures (i.e., not connected to each other by the thermoplastic composition transferred to the substrate).

Another potential advantage of the present invention may be found in the ability to provide a thin base film between thicker thermoplastic composition structures. The thicker thermoplastic composition structures are attached to the substrate, but the base film may or may not be attached to the substrate. The base film may be, e.g., attached to the substrate by adhesives.

Another potential advantage of the methods of the present invention is the ability to provide one or more polymeric structures that extend for the length of the substrate (while preferably not being formed over the width of the substrate, i.e., the polymeric structures are not coextensive with the major surface of the substrate).

Another potential advantage of the methods of the present invention is the ability to provide different thermoplastic compositions in different areas across the width of the substrate, such that some polymeric structures may be formed of one thermoplastic composition, while other polymeric structures are formed of a different thermoplastic composition.

Yet another potential advantage of the methods of the present invention is the ability to provide one or more polymeric structures on both major surfaces of a substrate. The polymeric structures on the opposing major surfaces may be formed with the same or different structures as desired.

In one aspect, the present invention provides a method for producing a composite web by providing a forming tool having an exterior surface that includes one or more depressions formed therein; delivering a molten thermoplastic composition onto the exterior surface of the forming tool; maintaining the exterior surface of the forming tool at a roll temperature that is below a melt processing temperature of the thermoplastic composition; wiping the molten thermoplastic composition on the exterior surface of the forming tool, wherein at least some of the molten thermoplastic composition enters the one or more depressions; transferring the thermoplastic composition in the one or more depressions to a substrate by contacting a first major surface of the substrate to the thermoplastic composition in the one or more depressions; and separating the substrate and the thermoplastic composition in the one or more depressions from the forming tool after the transferring. A composite web is formed that includes one or more polymeric structures of the thermoplastic composition located on the first major surface of the substrate, wherein the area occupied by at least one polymeric structure of the one or more polymeric structures includes a bonded area in which the thermoplastic composition of the polymeric structure is attached to the first major surface of the substrate and at least one detached area in which the polymeric structure is not attached to the first major surface of the substrate.

In another aspect, the present invention provides a method for producing a composite web by providing a forming tool having an exterior surface that includes one or more depressions formed therein; delivering a molten thermoplastic composition onto the exterior surface of the forming tool; maintaining the exterior surface of the forming tool at a roll temperature that is below a melt processing temperature of the thermoplastic composition; wiping the molten thermoplastic composition on the exterior surface of the forming tool, wherein at least some of the molten thermoplastic composition enters the one or more depressions; transferring the thermoplastic composition in the one or more depressions to a substrate by contacting a first major surface of the substrate to the thermoplastic composition in the one or more depressions; and separating the substrate and the thermoplastic composition in the one or more depressions from the forming tool after the transferring. A first portion of the thermoplastic composition in the one or more depressions that is distal from the surfaces of the one or more depressions remains at or above the melt processing temperature of the thermoplastic composition at least until the thermoplastic composition in the one or more depressions contacts the first major surface of the substrate, and wherein a second portion of the thermoplastic composition in the one or more depressions that is distal from surfaces of the one or more depressions falls below the melt processing temperature after the depositing and before contacting the first major surface of the substrate. A composite web is formed that includes one or more polymeric structures of the thermoplastic composition located on the first major surface of the substrate, wherein the area occupied by at least one polymeric structure of the one or more polymeric structures includes a bonded area attached to the first major surface of the substrate and a detached area that is not bonded to the first major surface of the substrate, wherein the bonded area includes the first portion of the thermoplastic composition and the detached area includes the second portion of the thermoplastic composition.

In another aspect, the present invention provides a composite web including a substrate having a first major surface; and one or more polymeric structures of a thermoplastic composition attached to the first major surface of the substrate; wherein each polymeric structure of the one or more polymeric structures occupies an area of the first major surface of the substrate. The area occupied by at least one polymeric structure of the one or more polymeric structures includes a bonded area in which the thermoplastic composition of the polymeric structure is attached to the first major surface and at least one detached area in which the polymeric structure is not attached to the first major surface of the substrate. In the detached area, the at least one polymeric structure is cantilevered over and aligned with the first major surface of the substrate.

In another aspect, the present invention provides a composite web including a substrate with a first major surface; and one or more polymeric structures of a thermoplastic composition attached to the first major surface of the substrate; wherein each polymeric structure of the one or more polymeric structures occupies an area of the first major surface of the substrate. The area occupied by at least one polymeric structure of the one or more polymeric structures includes a bonded area in which the thermoplastic composition of the polymeric structure is attached to the first major surface and three or more distinct detached areas extending from the bonded area, wherein the three or more distinct detached areas are cantilevered over but not attached to the first major surface of the substrate.

In another aspect, the present invention provides a closure system that includes a first closure element including a thermoplastic polymeric structure attached to a first major surface of a first substrate, wherein the first closure element occupies an area of the first major surface of the first substrate. The area occupied by the first closure element includes a bonded area in which the thermoplastic polymeric structure is attached to the first major surface of the first substrate and a detached area in which the thermoplastic polymeric structure is not attached to the first major surface of the first substrate. A portion of the thermoplastic polymeric structure in the detached area forms a first cantilevered tab supported above the first major surface of the first substrate, wherein the bonded area of the first closure element, the cantilevered tab of the first closure element, and the first major surface of the first substrate form a first pocket. The closure system also includes a second closure element including a thermoplastic polymeric structure attached to a first major surface of a second substrate. The second closure element occupies an area of the first major surface of the second substrate that includes, wherein the area occupied by the second closure element includes a bonded area in which the thermoplastic polymeric structure is attached to the first major surface of the second substrate and a detached area in which the thermoplastic polymeric structure is not attached to the first major surface of the second substrate. A portion of the thermoplastic polymeric structure in the detached area forms a second cantilevered tab supported above the first major surface of the second substrate, wherein the bonded area of the second closure element, the cantilevered tab of the second closure element, and the first major surface of the second substrate form a second pocket. The cantilevered tab of the first closure element is located in the second pocket and the cantilevered tab of the second closure element is located in the first pocket when the closure system is in a closed configuration.

In another aspect, the present invention provides a closure system that includes a substrate having a first major surface and one or more polymeric structures attached to the first major surface of the substrate, wherein each polymeric structure of the one or more polymeric structures occupies an area of the first major surface of the substrate. The area occupied by at least one polymeric structure of the one or more polymeric structures includes a bonded area in which the thermoplastic composition of the polymeric structure is attached to the first major surface and at least one detached area in which the polymeric structure is not attached to the first major surface of the substrate. In the detached area, the at least one polymeric structure is cantilevered over and aligned with the first major surface of the substrate. The closure system also includes a complementary surface having one or more openings capable of receiving the detached areas of the one or more polymeric structures. In a closed configuration, the first major surface of the substrate faces the complementary surface and the at least one detached area of the at least one polymeric structure is located within the one or more openings of the complementary surface such that movement of the complementary surface and the substrate relative to each other is restricted.

In another aspect, the present invention provides a closure system that includes a substrate having a first major surface and one or more polymeric structures attached to the first major surface of the substrate, wherein each polymeric structure of the one or more polymeric structures occupies an area of the first major surface of the substrate. The area occupied by at least one polymeric structure of the one or more polymeric structures includes a bonded area in which the thermoplastic composition of the polymeric structure is attached to the first major surface and three or more distinct detached areas extending from the bonded area in which the polymeric structure is not attached to the first major surface of the substrate. In the three or more distinct detached areas, the at least one polymeric structure is cantilevered over the first major surface of the substrate. The closure system also includes a complementary surface including one or more openings capable of receiving the distinct detached areas of the one or more polymeric structures. In a closed configuration, the first major surface of the substrate faces the complementary surface and at least one of the distinct detached areas of the at least one polymeric structure is located within the one or more openings of the complementary surface such that movement of the complementary surface and the substrate relative to each other is restricted.

These and other features and advantages of the present invention are described below in connection with various illustrative embodiments of the invention.

BRIEF DESCRIPTION OF THE DRAWINGS

FIG. 26a is a plan view of a plurality of oval shaped closure elements attached to a substrate. FIG. 26b is a cross-sectional view of a single oval shaped element of FIG. 26a taken along line 26b-26b in FIG. 26a.

FIG. 27a is a plan view of a plurality of closure elements attached to a substrate, the elements including detached areas with a barb on each detached region. FIG. 27b is a cross-sectional view of a closure element of FIG. 27a taken along line 27b-27b depicted in FIG. 27a.

FIG. 28a is a plan view of a plurality of closure elements attached to a substrate. FIG. 28b is an enlarged view of a single closure element of FIG. 28a. FIG. 28c is a cross-sectional view of a single closure element of FIG. 28b, taken along line 28c-28c depicted in FIG. 28b.

FIG. 29A is a plan view of a plurality of closure elements attached to a substrate. FIG. 29B is an enlarged plan view of some of the elements of FIG. 29A. FIG. 29C shows closure elements of FIGS. 29A and 29B prepared using MD grooves in the doctor blade to create regions to be bonded to the substrate.

FIG. 31a is a plan view of a spring-type engaging member closure element, wherein the closure element includes a bonded area and a detached area that is flexible and includes barbs. FIG. 31b shows the spring-type engaging member of FIG. 31a in an engaged orientation with a complementary slotted receiving member.

FIG. 32a is a perspective view of a composite web including raised portions in the form of ridges. FIG. 32b is a cross-sectional view of a composite web including raised portions and surrounding valleys and further including polymeric structures attached to the raised portions.

FIG. 33a depicts a first closure element attached to a substrate. FIG. 33b is a cross-sectional view of the closure element of FIG. 33 a mated with a complementary closure element on a second substrate, the cross-sectional view taken along line 33b-33b depicted in FIG. 33a.

DETAILED DESCRIPTION OF ILLUSTRATIVE EMBODIMENTS OF THE INVENTION

As discussed above, the present invention provides composite webs that include polymeric structures located on the surface of a substrate and that provide closure elements and systems of the present invention. Various different constructions will now be described to illustrate various embodiments of the closure elements and systems in accordance with the present invention. These illustrative constructions should not be considered to limit the present invention, which is to be limited only by the claims that follow.

As used herein, the term, "occupies" in reference to the closure elements and systems of the invention is understood to mean the element or system is located directly above a surface of a substrate or is attached to a surface of a substrate, and includes the circumstance in which an element or system includes both an area directly above a surface of a substrate and an area attached to a surface of a substrate.

As used herein, the term "fiber" includes fibers of indefinite length (e.g., filaments) and fibers of discrete length, e.g., staple fibers. The fibers used in connection with the present invention may be multicomponent fibers. The term "multicomponent fiber" refers to a fiber having at least two distinct longitudinally coextensive structured polymer domains in the fiber cross-section, as opposed to blends where the domains tend to be dispersed, random, or unstructured. The distinct domains may thus be formed of polymers from different polymer classes (e.g., nylon and polypropylene) or be formed of polymers from the same polymer class (e.g., nylon) but which differ in their properties or characteristics. The term "multicomponent fiber" is thus intended to include, but is not limited to, concentric and eccentric sheath-core fiber structures, symmetric and asymmetric side-by-side fiber structures, island-in-sea fiber structures, pie wedge fiber structures, and hollow fibers of these configurations.

Figure 1:
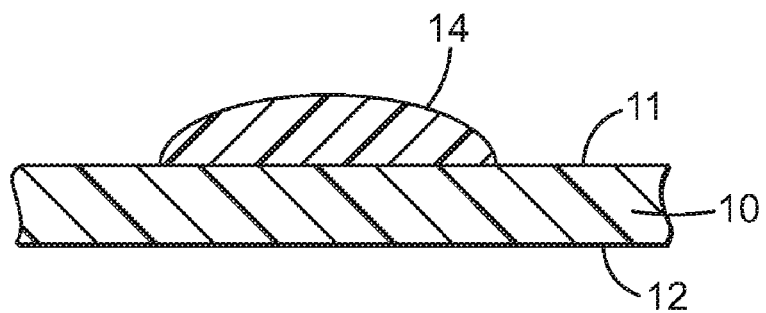
FIG. 1 is a cross-sectional view of one polymeric structure on a composite web manufactured according to the methods of the present invention.

FIG. 1 is a cross-sectional view of a portion of one composite web manufactured in accordance with the present invention. The composite web includes a substrate 10 with a first major surface 11 and a second major surface 12. One or more polymeric structures 14 are located on the first major surface 11 of the substrate 10, it being understood that the substrate may include more than one polymeric structure.

The polymeric structures 14 may cover any desired portion of the surface 11 of the substrate 10 on which they are positioned, although it will be understood that the polymeric structures 14 will not cover all of the surface of the substrate 10. For example, it may be preferred that the polymeric structures occupy less than all of the first major surface of the substrate, preferably less than 75% of the first major surface of the substrate, and optionally less than 50% of the first major surface of the substrate. At the lower end of the range, it may be preferred that the polymeric structures occupy at least 2% of the first major surface of the substrate, preferably 5% or more of the first major surface of the substrate, and optionally 10% or more of the first major surface of the substrate. Additional variations in the percentage of surface area occupied by polymeric structures may be as described in, for example, pending U.S. patent application Ser. No. 09/257, 447, entitled WEB HAVING DISCRETE STEM REGIONS, filed on Feb. 25, 1999 (published as International Publication No. WO 00/50229).

Figure 2:
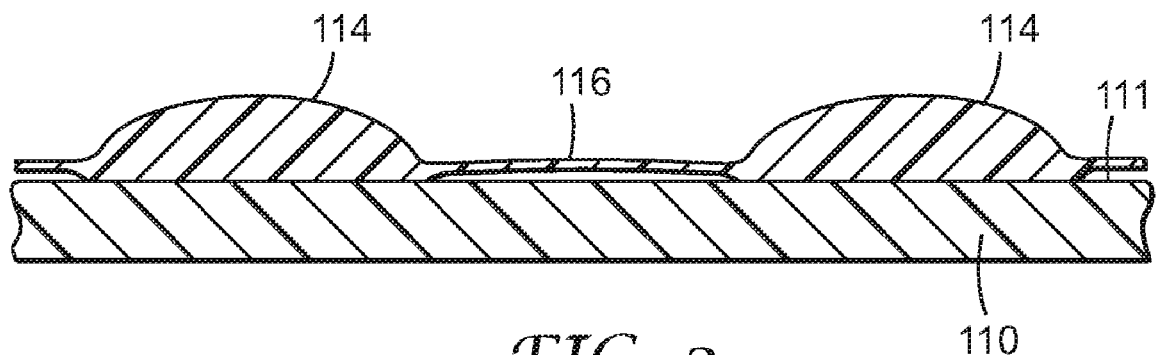
FIG. 2 is a cross-sectional view of polymeric structures and a base film on a composite web, with the base film being unattached to the substrate between the polymeric structures.

FIG. 2 depicts an alternative composite web construction in which polymer structures 114 are attached to the major surface 111 of a substrate 110. The polymeric structures 114 are, however, connected to each other by a thin base film 116. The base film 116 will typically be produced while forming and transferring to polymeric structures 114 to the substrate 110. Furthermore, the base film 116 will typically be manufactured of the same thermoplastic composition as the polymeric structures 114. Some exemplary processes of manufacturing polymeric structures with base films are described more completely below.

The base film 116 may be removed from the composite web after attachment of the polymeric structures 114 or it may be left in place. As seen in FIG. 2, the base film 116 may not be attached directly to the surface 111 of the substrate 110 over its entire surface. In such an arrangement, the base film 116 may be retained as a part of the composite web by attachment to the substrate 110 near the edges of the polymeric structures 114 and/or by attachment of the base film 116 to the polymeric structures 114 themselves.

The polymeric structures 114 and the base film 116 can be distinguished from each other in the composite web construction by their relative thickness. The polymeric structures 114 will have a maximum thickness (measured normal to the localized surface 111 of the substrate 110) that is greater than the maximum thickness of the base film 116. For example, the base film 116 may preferably have a maximum thickness that is 25% or less (more preferably 10% or less) of the maximum thickness of the polymeric structures 114 formed by depressions on the forming tool.

Figure 3:
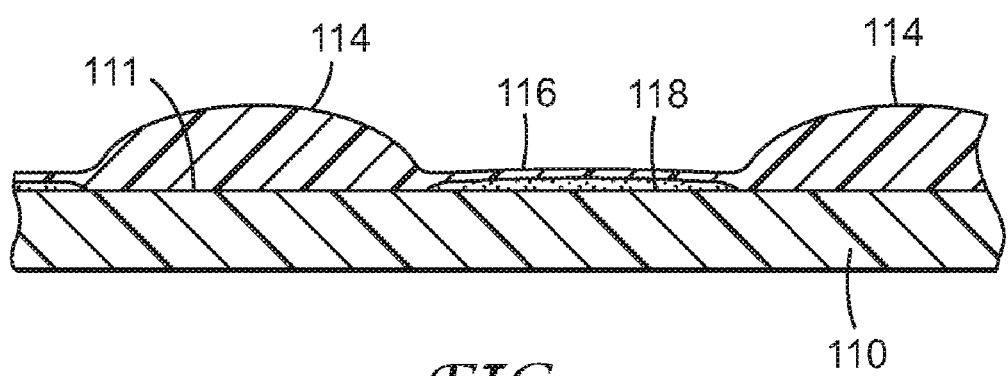
FIG. 3 is a cross-sectional view of polymeric structures and a base film on a composite web, with the base film attached to the substrate between the polymeric structures.

FIG. 3 depicts a composite web in which the base film 116 between the polymeric structures 114 is attached to the surface 111 of the substrate 110. In some instances, the base film 116 may be attached to the substrate 110 at the same time the polymeric structures 114 are attached thereto using the same mechanism used to attach the polymeric structures 114 (e.g., infiltration of the substrate 110 by the thermoplastic composition in the base film 116, intermixing of the thermoplastic composition of the base film 116 with the a substrate thermoplastic composition, etc.).

In other instances, the base film 116 may be attached to the substrate 110 after the polymeric structures 114 are attached thereto. For example, the base film 116 may be attached to the substrate 110 by, e.g., heat welding, chemical welding, heat sealing, pressure welding, lasers, ultrasonic energy, etc.

In the depicted embodiment, however, the base film 116 is attached to the surface 111 of the substrate 110 by adhesive 118 interposed between the base film 116 and the surface 111. The adhesive 118 may be any suitable composition, e.g., curable, pressure sensitive, heat activated, hot melt, etc. In addition, the adhesive 118 may be provided on the surface 111 of the substrate 110 before contacting the substrate with the base film 116 and polymeric structures 114, or it may provided on the base film 116 before contacting the base film 116 with the substrate 110.

Although adhesive 118 is not depicted as being located between the polymeric structures 114 and the substrate 110, it may be provided in those locations. The conditions (e.g., heat, pressure, etc.) encountered during attachment of the polymeric structures 114 to the substrate 110 may, however, result in degradation, etc. of the adhesive such that the adhesive 118 does not function as the primary mechanism of attachment to the substrate 110.

The polymeric structures on composite webs of the present invention may be uniformly spaced over the surface of the substrate in a regular, repeating pattern (in both the x and y directions) or the spacing and arrangement of polymeric structures may be non-uniform if so desired. Furthermore, the pattern in which the polymeric structures are arranged, may be irregular.

In other variations, portions of the composite webs manufactured in accordance with the present invention may include uniformly-spaced polymeric structures, while other portions of the same composite web may be free of any polymeric structures. In yet another alternative, portions of a composite web manufactured in accordance with the present invention may include uniformly spaced polymeric structures, while other portions of the same composite web may include polymeric structures that are arranged in non-uniformly spaced patterns. Further, different portions of a composite web manufactured according to the present invention may include different sets of polymeric structures that are both uniformly spaced in repeating patterns that are different from each other.

The polymeric structures could be provided in any desired shape, e.g., squares, rectangles, hexagons, etc. The shapes may or may not be in the form of recognized geometric shapes, but may be randomly formed with irregular perimeters. In addition, the shapes may not necessarily be solid figures, but may include islands formed within the shape in which none of the thermoplastic composition is transferred or a base film is transferred. In yet another alternative, some or all of the polymeric structures may be in the form of indicia, i.e., letters, numbers, or other graphic symbols.

The substrates used in connection with the composite webs of the present invention may have a variety of constructions. For example, the substrates may be a woven material, nonwoven material, knit material, netting, scrim, foam, paper, film, or any other continuous media that can be fed through a nip point. The substrates may have a wide variety of properties, such as extensibility, elasticity, flexibility, conformability, breathability, porosity, stiffness, etc. Further, the substrates may include pleats, corrugations, microcreping, or other deformations from a flat planar sheet configuration.

Unlike processes in which the substrates are contacted by rolls that are heated to temperatures that may result in softening or melting of the substrates such that the substrates lose their mechanical stability, the methods and systems of the present invention use rolls that are preferably maintained at temperatures that are below the temperatures that may result in softening or melting such that the substrates lose their mechanical stability. One potential advantage is that the substrates may be manufactured of the same or similar thermoplastic compositions as those found in the polymeric structures and base films. For example, it may be possible to apply polymeric structures of a polyolefin thermoplastic composition to a substrate that includes the same or similar thermoplastic composition (e.g., polypropylene polymeric structures on a polypropylene substrate).

In some instances, the substrates may exhibit some level of extensibility and also, in some instances, elasticity. Extensible webs that may be preferred may have an initial yield tensile force of at least about 50 gm/cm, preferably at least about 100 gm/cm. Further, the extensible webs may preferably be extensible nonwoven webs.

Suitable processes for making a nonwoven web that may be used in connection with the present invention include, but are not limited to, airlaying, spunbond, spunlace, bonded melt blown webs and bonded carded web formation processes. Spunbond nonwoven webs are made by extruding a molten thermoplastic, as filaments from a series of fine die orifices in a spinneret. The diameter of the extruded filaments is rapidly reduced under tension by, for example, by non-eductive or eductive fluid-drawing or other known spunbond mechanisms, such as described in U.S. Pat. Nos. 4,340,563 (Appel et al.); 3,692,618 (Dorschner et al.); 3,338,992 and 3,341,394 (Kinney); 3,276,944 (Levy); 3,502,538 (Peterson); 3,502,763 (Hartman) and 3,542,615 (Dobo et al.). The spunbond web is preferably bonded (point or continuous bonding).

The nonwoven web layer may also be made from bonded carded webs. Carded webs are made from separated staple fibers, which fibers are sent through a combing or carding unit which separates and aligns the staple fibers in the machine direction so as to form a generally machine direction-oriented fibrous nonwoven web. However, randomizers can be used to reduce this machine direction orientation.

Once the carded web has been formed, it is then bonded by one or more of several bonding methods to give it suitable tensile properties. One bonding method is powder bonding wherein a powdered adhesive is distributed through the web and then activated, usually by heating the web and adhesive with hot air. Another bonding method is pattern bonding wherein heated calender rolls or ultrasonic bonding equipment are used to bond the fibers together, usually in a localized bond pattern though the web can be bonded across its entire surface if so desired. Generally, the more the fibers of a web are bonded together, the greater the nonwoven web tensile properties.

Airlaying is another process by which fibrous nonwoven webs useful in the present invention can be made. In the airlaying process, bundles of small fibers usually having lengths ranging between 6 to 19 millimeters are separated and entrained in an air supply and then deposited onto a forming screen, often with the assistance of a vacuum supply. The randomly deposited fibers are then bonded to one another using, for example, hot air or a spray adhesive.

Meltblown nonwoven webs may be formed by extrusion of thermoplastic polymers from multiple die orifices, which polymer melt streams are immediately attenuated by hot high velocity air or steam along two faces of the die immediately at the location where the polymer exits from the die orifices. The resulting fibers are entangled into a coherent web in the resulting turbulent airstream prior to collection on a collecting surface. Generally, to provide sufficient integrity and strength for the present invention, meltblown webs must be further bonded such as by through air bonding, heat or ultrasonic bonding as described above.

A web can be made extensible by skip slitting as is disclosed in, e.g., International Publication No. WO 96/10481 (Abuto et al.). If an elastic, extensible web is desired, the slits are discontinuous and are generally cut on the web prior to the web being attached to any elastic component. Although more difficult, it is also possible to create slits in the nonelastic web layer after the nonelastic web is laminated to the elastic web. At least a portion of the slits in the nonelastic web should be generally perpendicular (or have a substantial perpendicular vector) to the intended direction of extensibility or elasticity (the at least first direction) of the elastic web layer. By generally perpendicular it is meant that the angle between the longitudinal axis of the chosen slit or slits and the direction of extensibility is between 60 and 120 degrees. A sufficient number of the described slits are generally perpendicular such that the overall laminate is elastic. The provision of slits in two directions is advantageous when the elastic laminate is intended to be elastic in at least two different directions.

A nonwoven web used in connection with the present invention can also be a necked or reversibly necked nonwoven web as described in U.S. Pat. Nos. 4,965,122; 4,981,747; 5,114,781; 5,116,662; and 5,226,992 (all to Morman). In these embodiments the nonwoven web is elongated in a direction perpendicular to the desired direction of extensibility. When the nonwoven web is set in this elongated condition, it will have stretch and recovery properties in the direction of extensibility.

The substrates used in connection with the present invention may preferably exhibit some porosity on one or both of the major surfaces of the substrate such that when a molten thermoplastic composition is provided on one of the major surfaces of the substrate, a mechanical bond is formed between the molten thermoplastic composition and the substrate as the molten thermoplastic composition infiltrates and/or encapsulates a portion of the porous surface of the substrate. As used in connection with the present invention, the term "porous" includes both structures that include voids formed therein, as well as structures formed of a collection of fibers (e.g., woven, nonwoven, knit, etc.) that allow for the infiltration of molten thermoplastic composition into the interstices between fibers. If the porous surface includes fibers, the thermoplastic composition may preferably encapsulate fibers or portions of fibers on the surface of the substrate.

If the substrate is not porous (e.g., is a film such as a polymeric film), but is made with a thermoplastic composition that has a melt processing temperature sufficiently low relative to the temperature of the molten thermoplastic composition in the depressions, then attachment of the polymeric structures may be achieved by intermixing (e.g., surface mixing as seen in, e.g., fusion bonding or heat sealing of, e.g., polymeric materials) of the thermoplastic compositions in the polymeric structures and the substrate. To attach polymeric structures in accordance with the present invention on substrates formed of thermoplastic compositions themselves, the substrate thermoplastic composition may preferably have a melt processing temperature that is at or below the melt processing temperature of the thermoplastic composition used in the polymeric structures formed thereon.

The type and construction of the material or materials in the substrate should be considered when selecting an appropriate substrate to which a molten thermoplastic composition is applied. For example, the substrate should have sufficient internal strength such that it does not fall apart during the process. Preferably, the substrate has sufficient strength in the machine direction at the temperature of the forming tool to remove it intact from the forming tool.

Although the substrates depicted in the various cross-sectional views of the articles manufactured according to the methods of the present invention are illustrated as single layer structures, it should be understood that the substrates may be of single or multi-layer construction. If a multi-layer construction is used, it will be understood that the various layers may have the same or different properties, constructions, etc. Some of these variations may be as described in, for example, pending U.S. patent application Ser. No. 09/257,447, entitled WEB HAVING DISCRETE STEM REGIONS, filed on Feb. 25, 1999 (published as International Publication No. WO 00/50229).

The polymeric structures of the present invention may be formed of a wide variety of different thermoplastic polymeric materials. Some examples of thermoplastic compositions that may be used in connection with the present invention include, but are not limited to, polyurethanes, polyolefins (e.g., polypropylenes, polyethylenes, etc.), polystyrenes, polycarbonates, polyesters, polymethacrylates, ethylene vinyl acetate copolymers, ethylene vinyl alcohol copolymers, polyvinylchlorides, acrylate modified ethylene vinyl acetate polymers, ethylene acrylic acid copolymers, nylons, fluorocarbons, etc. Suitable thermoplastic polymers will generally have a melt flow index of 5-200 grams/10 minutes measured at the appropriate conditions for the polymer as specified in ASTM D 1238. Furthermore, the thermoplastic composition may be, e.g., a thermoplastic hot melt adhesive.

The thermoplastic compositions of the present invention may include either or both of nonelastomeric or elastomeric thermoplastic polymers. A nonelastomeric thermoplastic polymer is one that is melt processable and that returns to its original condition or near its original condition upon cooling and which does not exhibit elastomeric properties at ambient conditions (e.g., room temperature and pressure). As used in connection with the present invention, "nonelastomeric" means that the material will not substantially resume its original shape after being stretched. Further, the nonelastomeric polymers may preferably sustain permanent set following deformation and relaxation, which set is preferably at least about 20 percent or more, and more preferably at least about 30 percent or more of the original length at moderate elongation, e.g., about 50% (for those materials that can even be stretched up to 50% without fracture or other failure).

An elastomeric (or elastic) thermoplastic polymer is one that melts and returns to its original condition or near its original condition upon cooling and exhibits elastomeric properties at ambient conditions (e.g., room temperature and pressure). As used in connection with the present invention, "elastomeric" means that the material will substantially resume its original shape after being stretched. Further, the elastomeric polymers may preferably sustain only small permanent set following deformation and relaxation which set is preferably no greater than about 30 percent and more preferably no greater than about 20 percent of the original length at moderate elongation, e.g., about 50%. The elastomeric thermoplastic compositions of the present invention can be both pure elastomers and blends with an elastomeric phase or content that will still exhibit substantial elastomeric properties at room temperature. U.S. Pat. No. 5,501,679 (Krueger et al.) provides some further discussion regarding elastomeric materials that may be considered for use in connection with the present invention.

The elastic thermoplastic compositions can include one or more polymers. For example, the polymer composition could be a blend with an elastomeric phase such that the polymer exhibits elastomeric properties at room temperature. Suitable elastic thermoplastic polymer compositions may include block copolymers such as conventional A-B or A-B-A block copolymers (e.g., styrene-isoprene-styrene, styrene-butadiene-styrene, styrene-ethylene-butylene-styrene block copolymers), elastomeric polyurethanes, olefinic elastomers, particularly elastomeric ethylene copolymers (e.g., ethylene vinyl acetates, ethylene/octene copolymer elastomers, ethylene/propylene/diene terpolymer elastomers), as well as mixtures of these with each other, with other elastic thermoplastic polymers, or with nonelastic thermoplastic polymers.

The thermoplastic compositions used in connection with the present invention can also be combined with various additives for desired effect. These include, for example, fillers, viscosity reducing agents, plasticizers, tackifiers, colorants (e.g., dyes or pigments), antioxidants, antistatic agents, bonding aids, antiblocking agents, slip agents, stabilizers (e.g., thermal and ultraviolet), foaming agents, microspheres, glass bubbles, reinforcing fibers (e.g., microfibers), internal release agents, thermally conductive particles, electrically conductive particles, and the like. The amounts of such materials that can be useful in the thermoplastic compositions can be readily determined by those skilled in the art of processing and using such materials.

Figure 4:
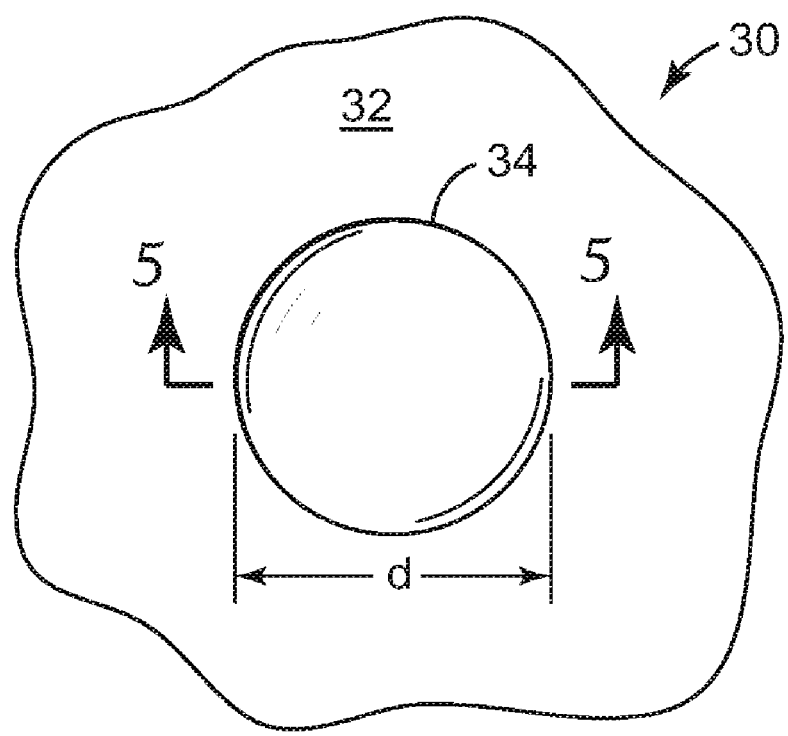
FIG. 4 is a plan view of a portion of a forming tool including a depression in its exterior surface that can be used in manufacturing composite webs according to the methods of the present invention.
Figure 5:
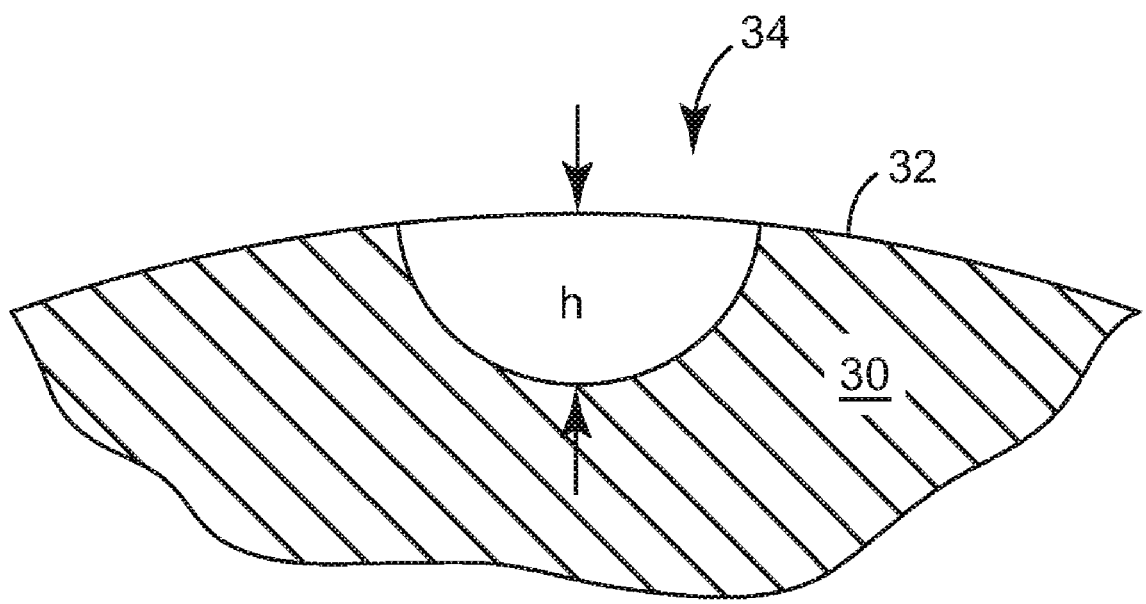
FIG. 5 is a cross-sectional view of the depression of FIG. 4 taken along line 5-5 in FIG. 4.

FIG. 4 is a plan view of one exemplary depression 34 in transfer roll 30 of the present invention, while FIG. 5 is a cross-sectional view of the depression 34 taken along line 5-5 in FIG. 4. The depression 34 has a circular footprint (i.e. shape of the opening into the depression 34 at the surface 32 of the roll) with a diameter represented by the letter d. The depression 34 has a depth (represented by the letter h) measured from the exterior surface 32 of the transfer roll 30.

Forming tools used in connection with the present invention preferably include depressions that are large enough to form polymeric structures on a substrate. The depressions and/or the polymeric structures formed according to the principles of the present invention may be characterized in a variety of manners. For example, the depressions 34 may be characterized in terms of the area occupied by their footprint on the exterior surface of the forming tool, a maximum dimension of the footprint (in any direction on the surface of the roll), the volume of the depression, the shape of the footprint, etc.

When characterized in terms of the area occupied by the footprint of the depressions, each of the depressions 34 may have a footprint with an area of about 4 square millimeters ($mm^2$) or more. In other situations, each of the depressions 34 may have footprints with an area of about 8 $mm^2$ or more.

Another manner in which the depressions may be characterized is in terms of the largest footprint dimension as measured on the surface 32 of the transfer roll 30. For a depression with a circular footprint as seen in FIGS. 4 and 5, the largest dimension is the same in all directions, but the depressions used in connection with the present invention may take any desired shape (e.g. elongated, irregular, etc.) in which the largest dimension will occur in one or more directions on the exterior surface of the transfer roll 30, but not in others. When characterized in terms of the largest footprint dimension, it may be that the depressions have a largest footprint dimension of about 2 millimeters (mm) or more, in some instances about 5 mm or more.

Where elongated strands are formed as a part of the polymeric structures (either by grooves in the forming tool or by strands of thermoplastic composition deposited on the exterior surface of the forming tool), it may be preferred that the strands have a width of 1 millimeter or more measured in a direction transverse to their length.

Yet another manner in which the depressions used in connection with the present invention may be characterized is in terms of volume. For example, the depressions may have a depression volume of at least about three (3) cubic millimeters ($mm^3$) or more, or alternatively, a depression volume of about five (5) cubic millimeters.

Figure 6:
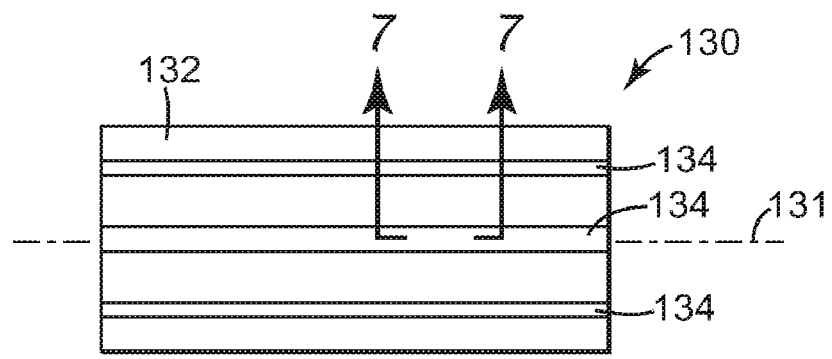
FIG. 6 is a plan view of alternative depressions on a forming tool that can be used to manufacture polymeric structures on a composite web according to the methods of the present invention.
Figure 7:
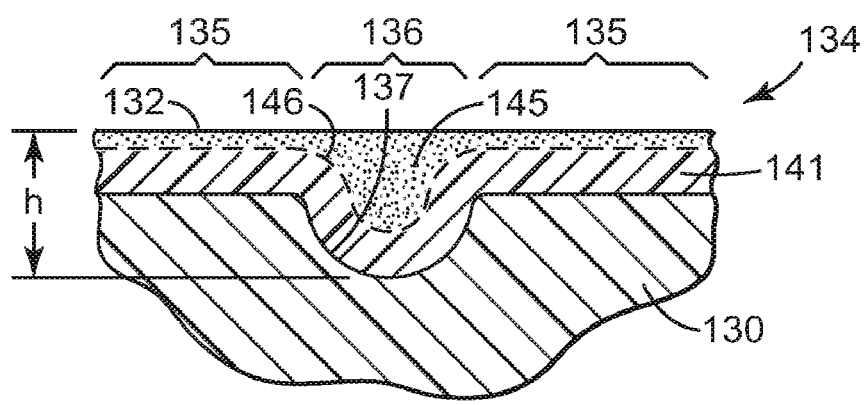
FIG. 7 is an enlarged cross-sectional view of a portion of one of the depression of FIG. 6, taken along line 7-7 in FIG. 6, wherein the depression contain thermoplastic composition.

FIGS. 6 and 7 depict another set of depressions on a forming tool 130 in which the depressions 134 are oriented substantially along the face of the roll 130 (i.e., generally aligned with axis 131). The roll 130 is designed to rotate about axis 131 in use and, as a result, the depressions 134 would typically deposit polymeric structures that are oriented in a cross-web direction (as opposed to a down web or machine direction). Although more than one depression 134 is depicted on the exterior surface 132 of the roll 130, it will be understood that the roll may include only one such depression formed in its exterior surface 132 if so desired.

The cross-sectional view of FIG. 7 (taken along line 7-7 in FIG. 6) depicts another optional feature of depressions in forming tools of the present invention. The depression 134 includes shallower areas 135 and deeper areas 136. The depth of the different areas is measured normal to the exterior surface 132 of the forming tool 130. For example, the deeper area 136 has a height h as seen in FIG. 7.

In FIG. 7, the depression 134 includes thermoplastic composition 141 located therein. The thermoplastic composition 141 within the depression 134 preferably exhibits two different properties that, in FIG. 7, are demarcated by broken line 146. The portion of the thermoplastic composition 141 proximate the surface 137 of the depression 134 (e.g., between the surface 137 and broken line 146) may preferably fall below the melt processing temperature of the thermoplastic composition 141 after it is deposited into the depression 134 but before the thermoplastic composition 141 in the depression 134 is contacted by a substrate (as discussed in more detail below). In some instances it may be possible to characterize the portion of the thermoplastic composition 141 that has fallen below the melt processing temperature as having frozen, solidified, formed a skin layer, etc.

In contrast, the portion of the thermoplastic composition 141 distal from the surfaces 137 of the depression 134 (e.g., on the opposite side of broken line 146) preferably remains at or above the melt processing temperature of the thermoplastic composition 141 at least until the thermoplastic composition 141 in the depression 134 is contacted by a substrate. Because the distal portion of the thermoplastic composition 141 remains at or above the melt processing temperature, it may be, e.g., characterized as molten. That distal portion of the thermoplastic composition 141 that remains at or above the melt processing temperature may be available to infiltrate a porous substrate or intermix with a polymeric substrate as described herein.

It should be understood that although broken line 146 demarcates a sharp boundary, the actual boundary between molten and solidified or frozen thermoplastic composition 141 may not be a sharp line, but, rather, a transition zone having a depth.

Another feature depicted in connection with FIG. 7 is the larger mass of thermoplastic composition 141 that fills the area 136 as compared to the smaller mass of molten thermoplastic composition that fills the shallower portions 135 of the depression 134 during processing. Those different amounts of thermoplastic composition in the different areas can provide a number of advantages.

One potential advantage is that the locally increased mass of thermoplastic composition 141 in area 136 may preferably include a larger mass of thermoplastic composition 141 that remains at or above the melt processing temperature as compared to the thermoplastic composition 141 in the shallower areas 135. The larger mass of thermoplastic composition 141 at or above the melt processing temperature within area 136 may be more effective at, e.g., infiltrating a porous substrate or intermixing with the same or different polymers in, e.g., a polymeric film substrate under the transfer conditions. Conversely, the smaller amount of thermoplastic composition 141 at or above the melt processing temperature in the shallower areas 135 may be less effective at, e.g., infiltrating a porous substrate or intermixing with the same or different polymers in, e.g., a polymeric film substrate under the transfer conditions.

In some instances, all of the thermoplastic composition 141 in the shallower areas 135 may fall below the melt processing temperature before contacting a substrate such that the thermoplastic composition 141 in the shallower areas 135 will not infiltrate or intermix with the substrate. In those same instances, however, it is preferred that at least a portion of the thermoplastic composition 141 in the deeper areas 136 remain at or above the melt processing temperature to retain its ability to infiltrate and/or intermix with a substrate such that bonds are formed between the thermoplastic composition in the depression 134 and the substrate.

The different amounts of thermoplastic composition 141 remaining at or above the melt processing temperature in the different areas 135 and 136 may contribute to the formation of a polymeric structure can be described as exhibiting differential bonding characteristics. The areas of the resulting polymeric structure that bond to the substrate (typically those corresponding generally to the deeper areas 136 in which more or at least some of the thermoplastic composition 141 remains at or above the melt processing temperature) can be described as "bonded areas." The portions of the polymeric structure that correspond to the shallower area 135 of depression 134 (typically those areas in which none of or less of the thermoplastic composition 141 remains at or above the melt processing temperature) may typically form limited or no bond with the substrate and, as such, may be referred to herein as a "detached area" of the polymeric structure formed by depression 134.

The depressions 134 depicted in FIGS. 6 and 7 represent one manner in which a locally increased mass of molten thermoplastic composition may be delivered in a larger depression. The depression 234 of FIGS. 8 and 9 preferably has a constant depth from the exterior surface 232 of the forming tool 230 along its length (see, e.g., the cross-sectional view of FIG. 9). A locally increased mass of molten thermoplastic composition can, however, be delivered by area 236 in which the depression 234 widens as compared to the narrower surrounding areas 235 of depression 234. As a result, the widened area 236 delivers a locally increased mass of molten thermoplastic composition that provide the differential bonding characteristics discussed above with respect to depression 134 of FIGS. 6 and 7. It should also be understood that the two features depicted in FIGS. 6-8 may be combined, e.g., depressions may be provided with locally increased masses of thermoplastic composition that are contained in areas that are both deeper and wider than the surrounding depression.

Figure 8:
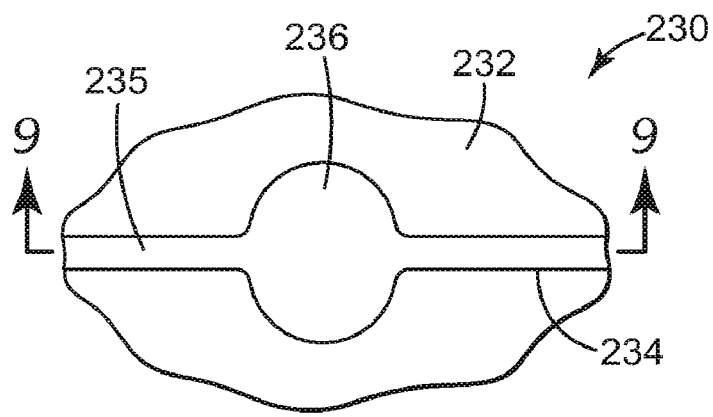
FIG. 8 is a plan view of a portion of another depression on a forming tool that can be used to manufacture polymeric structures on a composite web according to the methods of the present invention.
Figure 9:
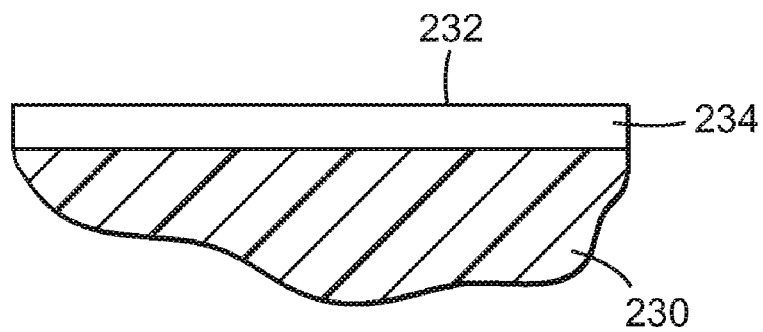
FIG. 9 is a cross-sectional view of the depression of FIG. 8, taken along line 9-9 in FIG. 8.

Depressions such as those depicted in FIGS. 6-8 may, in some instances, be characterized by volume differentials in one or more directions. For example, it may be preferred that, for elongated depressions, the areas of locally increased mass have a volume per unit length that is 25% or more (preferably 50% or more) of the volume per unit length of the surrounding depression.

Still another manner in which a locally increased mass of molten thermoplastic composition may be delivered to a substrate to achieve, e.g., differential bonding of a polymeric structure can be described with reference to FIGS. 23 & 24 below. In those processes, molten thermoplastic composition is applied over a mass of thermoplastic composition in a depression as, e.g., a strand of molten thermoplastic composition. Those areas in which the molten thermoplastic composition extends over molten thermoplastic composition in a depression may provide the locally increased mass of thermoplastic composition needed to form a differentially bonded polymer structure on a substrate.

FIGS. 10-13 depict still other variations in the depressions used to provide polymeric structures on substrates in connection with the methods of the present invention. The ring-shaped depression 334 is located in the surface 332 of a forming tool in the form of an elongated trough with an island 333 located in the ring formed by depression 334. Although the depicted ring-shaped depression 334 is an elongated oval-like shape, ring shaped depressions of the present invention may be formed in any desired shape, e.g., circular, square, triangular, etc.

Figure 10:
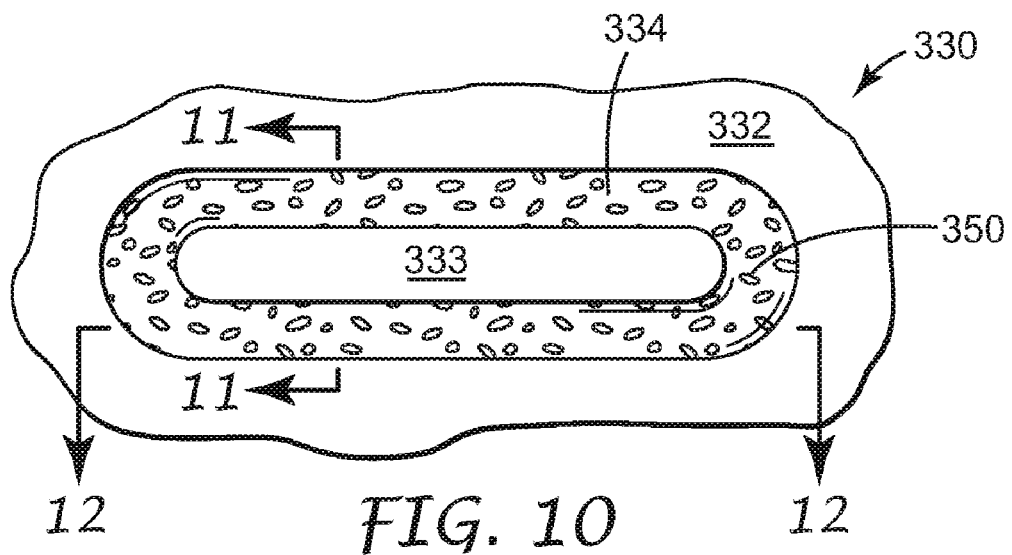
FIG. 10 is a plan view of one ring-shaped depression on a forming tool.

Depressions that include islands such as that depicted in FIG. 10 can be used to provide polymeric structures on a substrate in which a portion of the substrate is exposed within a surrounding polymer structure or in which a base film is provided within a surrounding polymer structure. The resulting construction may, for example, be used to reinforce the substrate in the area of, e.g., a buttonhole, slot, perforation, or other opening formed on in the substrate. Other uses for similar structures may also be envisioned.

The island 333 formed in the center of depression 334 may be the same height as the exterior surface 332 of the forming tool that surrounds the depression 334. Although the depression 334 is depicted with only a single island 333 formed therein, depressions used in connection with the methods of the present invention may include two or more islands located within each depression if so desired. Furthermore, the shape of the island and surrounding depression may also vary, e.g., a depression that has a circular outermost perimeter may be paired with an island having a different shape. In another variation, the island may not be centered within the depression as depicted in FIG. 10.

The orientation of the depression 334 on a forming tool 330 may be selected based on a variety of factors. The depression 334 may be aligned in the machine direction (i.e., the direction of travel of a substrate), in the cross-web direction (i.e., transverse to the direction of travel of the substrate), or any other orientation between machine direction or cross-web direction.

Figure 11:
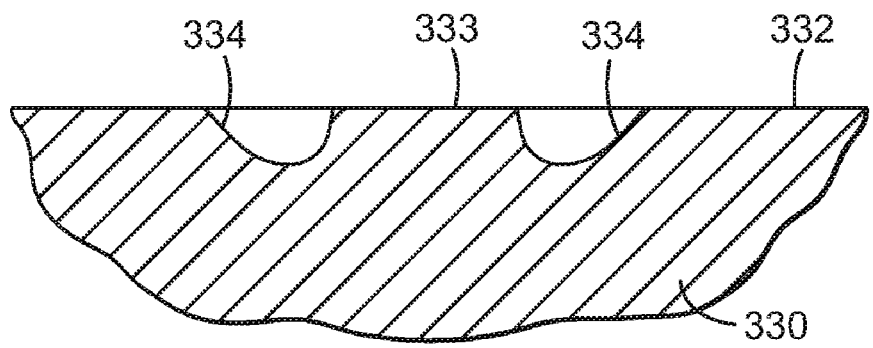
FIG. 11 is a cross-sectional view of the depression of FIG. 10, taken along line 11-11 in FIG. 10.

Another variation depicted in FIG. 11 is the variation in depth of the depression 334, with the depression being deepest proximate the island and rising to a shallower depth at the outermost perimeter of the depression 334. Such a construction may provide a polymeric structure with more flexible edges due to thinning of the polymeric structure.

Figure 12:
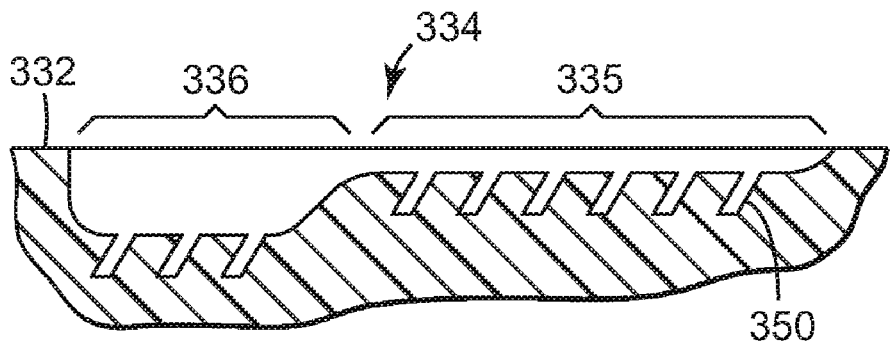
FIG. 12 is a cross-sectional view of the depression of FIG. 10 taken along line 12-12 in FIG. 10.

FIG. 12 depicts another optional variation in the depression of FIG. 10. As seen in the cross-sectional view of FIG. 12, the depth of the depression 334 from the exterior surface of the 332 of the forming tool 330 may vary with an area 335 being shallower than the deeper area 336. That deeper area 336 of depression 334 provides a locally increased mass of molten thermoplastic composition for transfer to a substrate.

Figure 13:
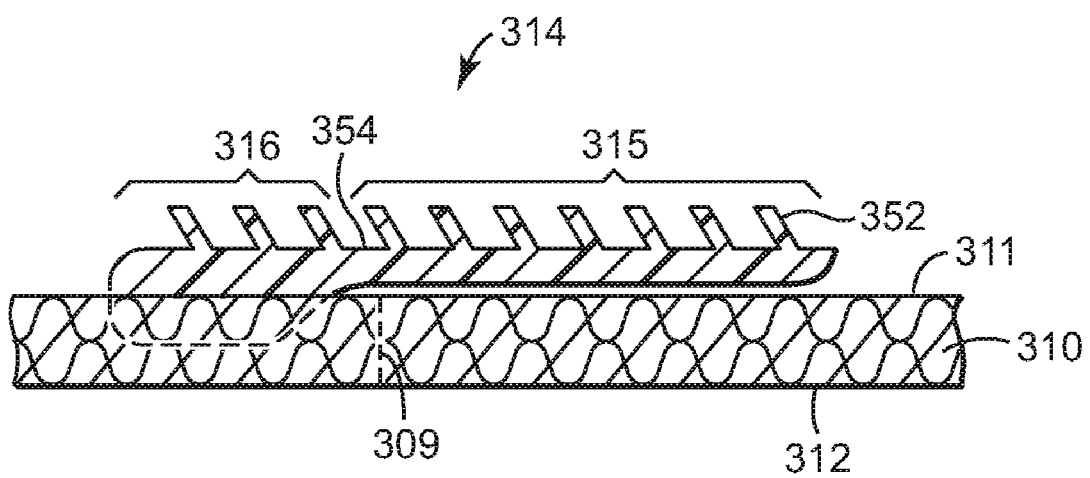
FIG. 13 is a cross-sectional view of a polymeric structure formed by the depression of FIG. 10 on a substrate.

One example of a polymeric structure 314 that can be formed on surface 311 of substrate 310 by the depression 334 is depicted in FIG. 13. The polymeric structure 314 occupies an area on the surface 311 of substrate 310. The area occupied by the polymeric structure 314 can be described as including a detached area 315 corresponding to the shallower area 335 of depression 334 and a bonded area 316 corresponding to the area 336 of depression 334. The substrate 310 may be porous on the surface 311. As a result, the increased mass of thermoplastic composition in the area 336 results in infiltration of the of the substrate 310 by the thermoplastic composition within the bonded area 316 of the polymeric structure 314 as depicted by the broken line within the body of the substrate 310. In comparison, the reduced mass of thermoplastic composition in the area 335 of depression 334 results in little or no infiltration of the substrate 310 by the thermoplastic composition in the detached area 315 of the polymeric structure 314. As a result, the polymeric structure 314 can be described as differentially bonded to the substrate 310.

In some instances the differential bonds can be characterized by penetration of the thermoplastic composition into a porous substrate. For example, the thermoplastic composition within the bonded area 316 may preferably infiltrate the porous substrate 310 to a depth of at least 50% of the thickness of the porous portion of the substrate 310 (which, in the case of the depicted substrate 310, the porous portion is all of the thickness of the substrate). In contrast, the thermoplastic composition within the detached area 315 may preferably infiltrate the substrate 310 to a depth of 25% or less of the thickness of the porous portion of the substrate 310. In the depicted example, the thermoplastic composition in the detached area 315 does not infiltrate the substrate 310 at all.

If the surface 311 of the substrate 310 is not porous, but is, for example, a film manufactured of a thermoplastic composition, the differential bonding characteristic described above may also be achieved, with the bonded area 316 being attached by, e.g., intermixing of the molten thermoplastic composition of the polymeric structure 314 with the thermoplastic composition of the surface 311 of the substrate 310. The thermoplastic composition of the polymer structure 314 in the detached area 315 may exhibit little or no intermixing with the thermoplastic composition on the surface 311 of the substrate 310.

Another variation illustrated in connection with FIGS. 12 & 13 are the surface features 352 formed on the upper surface 354 of the polymeric structure 314 (where the upper surface 354 generally faces away from the substrate 310). The surface features 352 may include, for example, stems (capped or otherwise), hooks (as part of a hook and loop fastening system), pyramids, indicia (alphanumeric or otherwise), etc. Although the surface features 352 may be useful in mechanical fastening systems, the surface features provided on polymeric structures of the present invention may serve other functions including, but not limited to, grip enhancement, abrasion, polishing, etc. Furthermore, it should be understood that surface features may be provided on all or only some of the polymeric structures.

The surface features 352 of FIG. 13 are depicted as stems oriented at an acute angle with respect to the surface 354 of the polymeric structure 314. Although the stems are depicted as having substantially constant dimensions, they may be tapered, bent, capped, or otherwise formed to enhance their use as, e.g., mechanical fasteners. Furthermore, although the stems are depicted as angled in one direction, they may alternatively be angled in different directions and/or oriented normal to the surface 354.

The orientation of the stems depicted in FIG. 13 may be advantageous for a number of reasons. For example, the angled stems may not require a cap or other structure to engage a loop surface or other fibrous substrate adapted to engage the stems. The composite web depicted in FIG. 13 may exhibit the ability to fasten to a loop or other surface in a selected direction while releasing when the web is moved in the opposite direction. Such a construction may be particularly useful in connection with an elastic substrate.

The angled orientation of the stems depicted in FIG. 13 may be provided in a variety of manners. For example, the stems may be manufactured using a tool having holes or cavities that are angled or tilted in the desired direction or directions. Alternatively, the stems may be bent after formation.

The depression 334 seen in FIG. 12 includes cavities 350 in which the surface features 352 are formed by a thermoplastic composition filling the depression 334 (the cavities 350 are also depicted in the plan view of FIG. 10). The shape, size, spacing, depth and other characteristics of the cavities 350 may vary depending on factors such as the thermoplastic composition being used, the temperature of the thermoplastic composition delivered to the depression, etc.

The shape or profile of the cavities (and the resulting surface features 352 they form) may differ from those depicted in connection with FIGS. 12 & 13. For example, the cavities may be formed in more of a hook-shape, have tapered diameters, etc. Some example of alternatively shaped cavities and the structures that may be formed using them are depicted in, e.g., U.S. Pat. No. 5,792,411 (entitled LASER MACHINED REPLICATION TOOLING), U.S. Pat. No. 6,190,594 B1

(entitled TOOLING FOR ARTICLES WITH STRUCTURED SURFACES), U.S. Pat. No. 6,432,339 (entitled CONTINUOUS MOLDING OF FASTENER PRODUCTS WITH A MOLD BELT), etc.

In another variation depicted in FIG. 13, the substrate 310 may terminate in the area occupied by the portion 315 of the polymeric structure 314. An example of this is depicted by broken line 309 in FIG. 13. The line 309 may denote the edge of the substrate 310 during the transfer process or the line 309 may denote a line along which the substrate 310 may be separated after the polymeric structure 314 is transferred to the surface 311.

In still another variation, the substrate 310 itself may include a loop structure on the surface opposite that on which the polymeric structures are located or within the areas on the same surface as the polymeric structures that are not occupied by the polymeric structures. As a result, the composite web may provide a unitary fastener having both stems, hooks, etc, and the complementary loop material needed for fastening.

Figure 14:
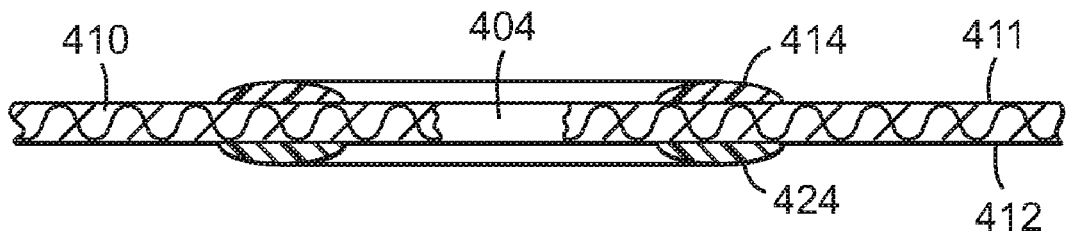
FIG. 14 is a cross-sectional view of a portion of a composite web with ring-shaped polymeric structures on both major sides of a substrate.

FIG. 14 depicts yet another embodiment of a composite web manufactured in accordance with the present invention. The composite web includes a substrate 410 with opposing major surfaces 411 and 412. One feature illustrated in FIG. 14 is the two-sided nature of the polymeric structures located on the opposing major surfaces 411 and 412, respectively. Polymeric structure 414 is provided on major surface 411 and polymeric structure 424 is provided on opposing major surface 412. Both polymeric structure 414 and polymeric structure 424 are exposed on opposite sides of the composite web.

The polymeric structures on opposing major surfaces are depicted as being in registration through the substrate 410. In other words, the polymeric structure 414 is aligned with the polymeric structure 424 on the opposite side of the substrate 410. Further, the polymeric structure 414 is depicted as being substantially the same size as the polymeric structure 424 located on the opposite side of the substrate 410. It should, however, be understood that when a composite web having polymeric structures on both major surfaces is desired, the polymeric structures on the opposing surfaces may or may not be the same size as seen in FIG. 14. Also, it should be understood that the polymeric structures may or may not be in registration with each other through the substrate 410 as seen in FIG. 14.

The polymeric structures 414 and 424 may be envisioned as forming a grommet structure on the substrate 410. As a result, it may be desired to provide an optional opening 404 through the substrate 410 as seen in FIG. 10. The opening may be formed by any suitable technique, e.g., mechanical perforation with a tool, laser ablation, water or gas-jet cutting, etc.

Although not depicted, other variations in composite webs manufactured according to the present invention may include two or more substrates laminated together with one or more polymeric structures located between the laminated substrates. Such laminated constructions may be useful, for example, to provide a cloth-like or softer feel or appearance, breathability, porosity, etc. on both sides of the composite web. This is in contrast to the composite webs in which the polymeric structures are located on an exposed surface of the composite web. A laminated composite web structure may also be used to provide different properties on opposite sides of the composite web structure. For example, the porosity or other properties may differ between the different substrates. Examples of such laminating processes may be described in, e.g., U.S. Patent Application Publication No. U.S. 2003/0087098 A1, filed 5 Nov. 2001 and titled COMPOSITE WEBS WITH REINFORCING POLYMERIC REGIONS AND ELASTIC POLYMERIC REGIONS and U.S. Patent Application Publication No. U.S. 2003/0084996 A1, filed 5 Nov. 2001 and titled METHODS FOR PRODUCING COMPOSITE WEBS WITH REINFORCING DISCRETE POLYMERIC REGIONS.

Figure 15:
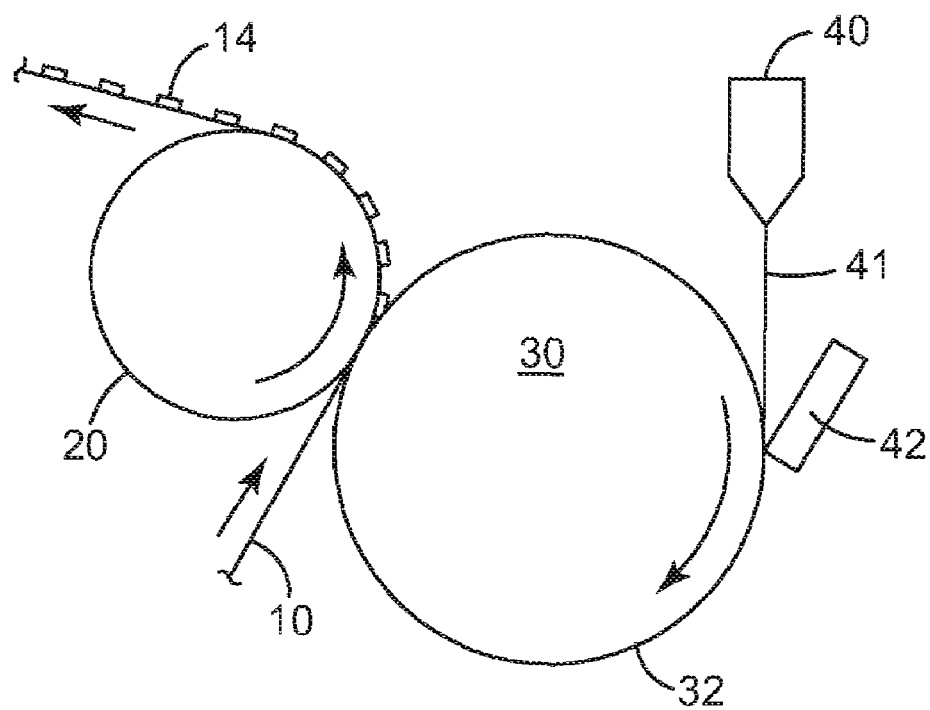
FIG. 15 is a diagram of one polymer transfer system that may be used to provide polymeric structures on a substrate in accordance with the methods of the present invention.

FIG. 15 depicts a web path and rolls in one system and method of providing polymeric structures 14 on one surface of a substrate 10 in accordance with the principles of the present invention. The system depicted in FIG. 15 includes a substrate 10 that defines a web path through the system. The substrate 10 moves through the system in a downstream direction indicated by the rotation arrows on the various rolls. After being unwound or otherwise provided from a supply (e.g., the substrate 10 may be manufactured in-line with the system depicted in FIG. 15), the substrate 10 is directed into a transfer nip formed between a backup roll 20 and a forming tool 30.

Although the composite web may preferably be formed using a forming tool in the form of a roll in the illustrated embodiments, it should be understood that the forming tools of the present invention may alternatively be provided in forms other than rolls, e.g., endless belts, etc. Furthermore, the forming tool (roll or otherwise) may be manufactured by any suitable technique, e.g., a machining, etching, helically-wound rolls (such as in, e.g., U.S. Pat. No. 6,190,594 B1 entitled TOOLING FOR ARTICLES WITH STRUCTURED SURFACES), stacked plate technology, etc.

The process of providing polymeric structures 14 on the substrate 10 includes delivering a supply of a molten thermoplastic composition to the exterior surface 32 of forming roll 30 that includes a one or more depressions formed in its exterior surface 32. The molten thermoplastic composition 41 is supplied to the exterior surface 32 of the forming roll 30 by a delivery apparatus in the form of a an extruder 40. The molten thermoplastic composition is wiped or removed from the exterior surface 32 by a doctor blade 42 acting against the exterior surface 32 of the forming roll 30. Although it may be desirable to remove all of the thermoplastic composition from the exterior surface 32 of the forming roll 30, some of the thermoplastic composition may remain on the exterior surface 32 after wiping by the doctor blade 42.

The doctor blade 42 is preferably heated to a temperature that is at least the melt processing temperature of the thermoplastic composition. It may be preferred that the doctor blade temperature be the same as the temperature of the molten thermoplastic composition 41 extruded by the extruder 40 or even higher.

The roll temperature of roll 30 is also preferably controlled in the systems of the present invention. As discussed above, it is preferred that the roll temperature be lower than the melt processing temperature of the thermoplastic composition being deposited on the roll 30. By controlling the roll temperature, various processing advantages may be obtained as discussed herein.

The extruder 40 in the depicted system preferably extrudes the molten thermoplastic composition 41 into the interface of the doctor blade 42 and the exterior surface 32 of the roll 30. In some instances, the molten thermoplastic composition 41 may flow down the doctor blade 42 to the interface between the blade 42 and the roll 30.

The depressions formed in the exterior surface 32 of the forming roll 30 preferably receive a portion of the molten thermoplastic composition when the molten thermoplastic composition is deposited on the exterior surface 32 of the forming roll 30. Filling of the depressions by the molten thermoplastic composition may be enhanced by the wiping action of the doctor blade 42 on the exterior surface 32 of the forming roll 30. The flow rate of the molten thermoplastic composition 41 from the extruder may be controlled such that the volume of the molten thermoplastic composition may preferably be equivalent to the volume of the depressions passing the doctor blade. That relationship may be advantageous because it may prevent or reduce the accumulation of thermoplastic composition behind the doctor blade 42. Accumulation of the thermoplastic composition behind the doctor blade 42 may be detrimental because of the lower roll temperature, which can cause the viscosity of the thermoplastic composition to increase such that the depressions cannot be filled properly.

Figure 16:
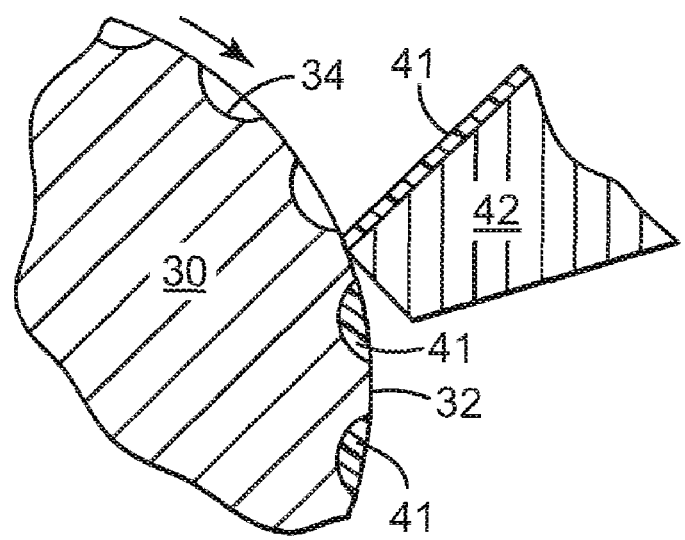
FIG. 16 is an enlarged schematic diagram depicting one relationship between a doctor blade and depressions on a forming roll in the system of FIG. 15.

FIG. 16 is an enlarged partial cross-sectional view depicting one relationship between a doctor blade 42 and exterior surface 32 with depressions 34 in a forming roll 30. The roll 30 rotates such that the exterior surface 32 is moving past the doctor blade 42 in the direction shown by the arrow. The molten thermoplastic composition 41 in the depicted embodiment is incident on the upper surface of the doctor blade 42 and flows down that surface towards the interface between the doctor blade 42 and the exterior surface 32 of the roll 30. Alternatively, the molten thermoplastic composition flow could be adjusted such that it flows directly into the interface between the doctor blade 42 and the roll 30.

As the depressions pass underneath the doctor blade 42, they are preferably filled with the molten thermoplastic composition 41 as seen in FIG. 16. In the depicted embodiment, the flow of molten thermoplastic composition 41 is preferably adjusted such that it is equivalent to the volume of the depressions 34 passing underneath the doctor blade 42. The result is that only a limited amount or none of the thermoplastic composition material accumulates at the interface of the roll 30 and the doctor blade 42.

Achieving that result may involve controlling the temperature of the roll 30 along with one or more of the following: doctor blade temperature, molten thermoplastic composition temperature, roll speed, flow rate of the molten thermoplastic composition, the pressure or force exerted on the forming roll 30 by the doctor blade 42, etc.

Figure 17:
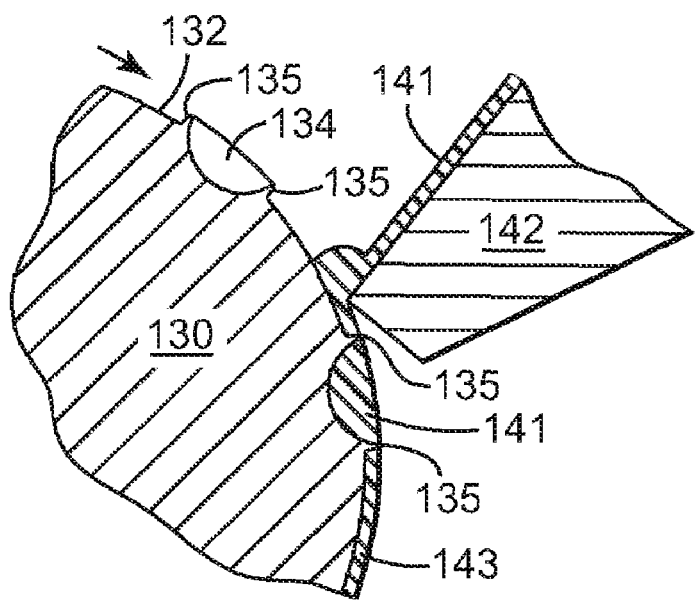
FIG. 17 is an enlarged schematic diagram depicting one relationship between a doctor blade and depressions on a forming roll in the system of FIG. 15 in which a base film is formed on the exterior surface of the forming roll.

Another optional feature depicted in FIG. 16 is that the molten thermoplastic composition 41 is largely removed from the exterior surface 32 of the roll 30 by the doctor blade 42. As such, the molten thermoplastic composition in the depressions 34 that have passed the doctor blade 42 is limited to the depressions only. In contrast, FIG. 17 depicts an alternative process in which a layer 143 of the molten thermoplastic composition 141 remains on the exterior surface 132 of the roll 130 after the depressions have passed the doctor blade 142. That layer 143 can be used to form the base films described in connection with FIGS. 2 and 3 above. Control over the formation of a base film in the systems and methods of the present invention may be achieved by adjusting, e.g., roll temperature, doctor blade temperature, molten thermoplastic composition temperature, roll speed, flow rate of the molten thermoplastic composition, the pressure or force exerted on the forming roll by the doctor blade, the gap (if any) between the doctor blade and the forming roll, the spacing between the depressions, the volume of the depressions, etc.

Another optional feature depicted in connection with FIG. 17 is the addition of a ridge 135 around at least a portion of the perimeter of the depressions 134. The ridge 135 is raised above the exterior surface 132 of the roll 130. One potential advantage of the raised ridge 135 is that it may facilitate removal of a base film from polymeric structures on a substrate by providing a thinner area of weakness around the perimeter of the polymeric structure.

Returning to FIG. 15, with the depressions at least partially filled with the desired molten thermoplastic composition, the forming roll 30 continues to rotate until the depressions and the molten thermoplastic composition they contain are forced into contact with the substrate 10 against backup roll 20 at the transfer nip (i.e., the nip formed by the forming roll 30 and the backup roll 20). It is at this point that transfer of the molten thermoplastic composition in the depressions to the substrate 10 begins. By controlling the roll temperature to a point below the melt processing temperature of the thermoplastic composition, the thermoplastic composition in the depressions may preferably release cleanly from the depressions such that substantially all of the thermoplastic composition in the depressions is transferred to the substrate 10.

When a substrate 10 that includes one or more porous major surfaces on which the molten thermoplastic composition is deposited is used in connection with the methods of the present invention, a mechanical bond may preferably be formed by infiltration of the molten thermoplastic composition into the porous surface of the substrate 10. As used in connection with the present invention, the term "porous" includes both structures that include voids formed therein, as well as structures formed of a collection of fibers (e.g., woven, nonwoven or knit) that allow for the penetration of molten thermoplastic compositions. If the substrate 10 is not porous but is made of a thermoplastic composition, attachment of the polymeric structures may be achieved by intermixing as described herein.

The nip pressure between the forming roll 30 and the backup roll 20 is preferably sufficient to result in attachment of the thermoplastic composition in the depressions of the roll 30 to the substrate 10. If the substrate surface is porous, a portion of the thermoplastic composition in the polymeric structures infiltrates and/or encapsulates a portion of the porous substrate 10 to improve attachment of the polymeric structures to the substrate 10. Where the surface of the substrate 10 includes fibers (e.g., where the substrate 10 includes woven, nonwoven, or knit materials on its major surfaces), it may be preferred that the thermoplastic composition encapsulate all or a portion of at least some of the fibers on the surface of the substrate 10 to improve attachment of the polymeric structures to the substrate 10.

Under some conditions the molten thermoplastic composition in the depressions 34 may completely permeate the substrate 10 if, e.g., the substrate 10 is porous throughout its thickness. In other instances, penetration of the molten thermoplastic composition may be limited to the outer layer or layers of the substrate 10.

It should, however, be understood that although the outer surfaces of the substrate 10 may exhibit some porosity, that porosity may not necessarily extend through the entire thickness of the substrate 10. For example, the substrate 10 may have a variety of different layers, with one of the layers being substantially non-porous. In another alternative, the overall thickness of the substrate 10 may render it non-porous as a whole, even though the outer surfaces of the substrate 10 exhibit some porosity as discussed above.

The backup roll 20 may possess a variety of different characteristics depending on the types of substrate materials and/or molten thermoplastic compositions being processed. In some instances, the exterior of the backup roll 20 may be a rubber or other conformable material that conforms to the shape of the forming roll 30. If a conformable material such as rubber is used, it may, e.g., have a durometer of, e.g., about 10-90 Shore A.

Figure 18:
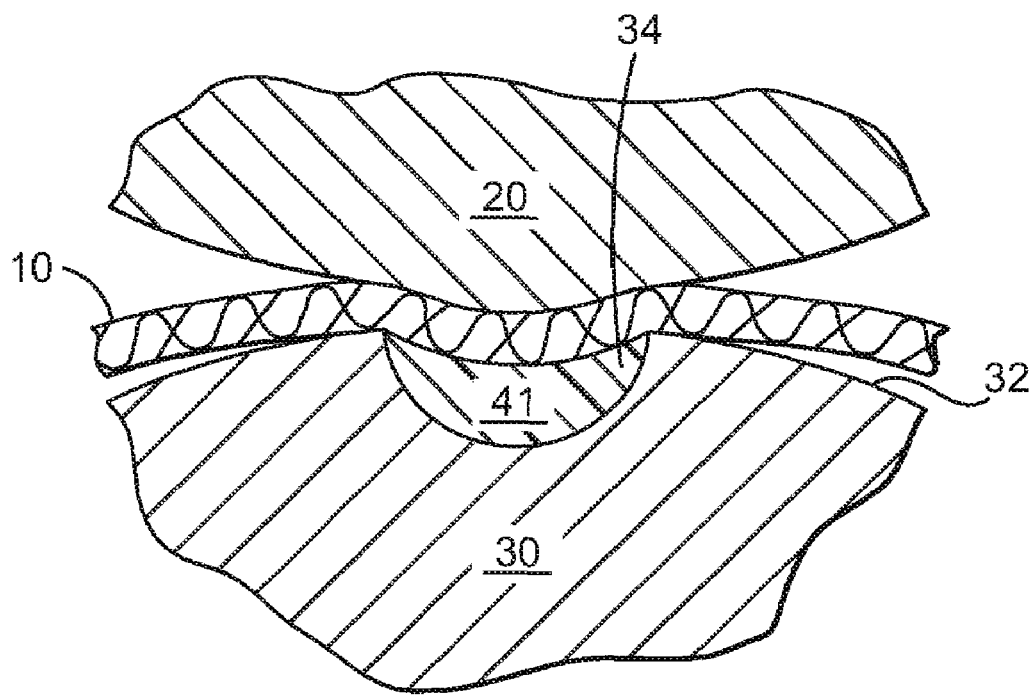
FIG. 18 is an enlarged partial cross-sectional view depicting a conformable backup roll forcing a substrate against a forming roll.

One such variation at the transfer nip is depicted in the enlarged cross-sectional view of FIG. 18, in which a conformable backup roll 30 is depicted as forcing a portion of the substrate 10 into the depression 34 (and the thermoplastic composition 41 contained therein). If the surface of the substrate 10 facing the depression 34 is porous, a portion of the molten thermoplastic composition 41 may be forced in the porous surface of the substrate 10. Forcing the substrate 10 into the depression may be particularly beneficial if the depression 34 is not completely filled with the molten thermoplastic composition 41 to improve the likelihood of contact between the substrate 10 and the molten thermoplastic composition 41.

Other backup rolls may also be used in connection with the present invention. For example, the backup roll may have mating protrusions that act to force the substrate into the depressions. In another alternative, the backup roll may have a structured (as opposed to a smooth) surface such that increased pressure is applied to the substrate 10 only where the backup roll has a raised structure. For example, the backup roll may have a corrugated surface or other wise include ribs, posts, etc. to achieve differential bonding of the polymeric structures formed in the depressions to the substrate 10.

By controlling the temperature of the forming roll as discussed above, transfer of the thermoplastic composition 41 in the depression 34 may be enhanced because the cooler roll temperature preferably results in freezing or solidification of the thermoplastic composition directly adjacent the surfaces of the depression 34, while an amount of the thermoplastic composition 41 that is furthest from the surfaces of the depression 34 remains sufficiently molten to accomplish desired attachment to the substrate 10. Release of the thermoplastic composition from the depressions 34 and/or the exterior surface 32 of the roll 30 may be enhanced if those surfaces are coated with low surface energy materials (e.g., fluoroethylenes, etc.).

In addition to controlling the temperature of the forming roll, it may also be beneficial to control the temperature of the backup roll 20. For example, it may be desirable to heat or cool the surface of the backup roll 20 to a selected temperature.

Although the system and method depicted in FIG. 15 produces composite webs with polymeric structures on only one major side thereof, polymeric structures may be provided on both major surfaces of the substrate in accordance with the principles of the present invention. One example may include, e.g., forming polymeric structures on one surface of each of two separate substrates, with the two substrates then being laminated together to form a single substrate with polymeric structures on both major surfaces (see, e.g., FIG. 14). Alternatively, a single substrate may be directed into a nip formed by two forming rolls, with each of the forming rolls depositing polymeric structures on both sides of the web essentially simultaneously.

Figure 19:
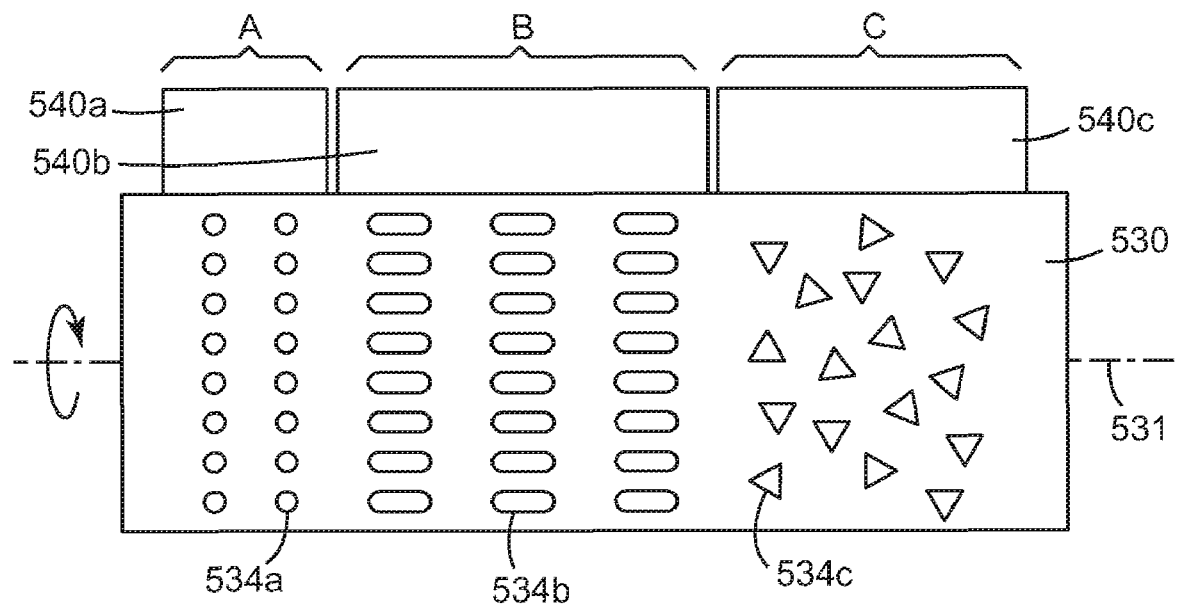
FIG. 19 illustrates another forming roll and polymer source useful in connection with zoned delivery systems and methods.

Although FIG. 15 depicts the application of only one thermoplastic composition using the forming roll 30, it will be understood that two or more different thermoplastic compositions may be applied to the exterior surface of the forming roll 30. FIG. 19 depicts a portion of one system in which three molten thermoplastic compositions (in zones A, B, & C) are delivered to different portions of the surface of a forming roll 530 that rotates about an axis 531. If extruders 540*a*, 540*b* and 540*c* are used, the different thermoplastic compositions may be delivered in a manner such that molten thermoplastic compositions in the different zones do not mix during processing.

The forming roll 530 also includes different sets of depressions 534*a*, 534*b*, and 534*c* over which the different molten thermoplastic compositions may be applied. The depressions in the different zones on forming roll 530 are differently shaped, have different sizes, and have different spacing. For example, the triangular depressions in zone C are arranged in an irregular, non-repeating pattern while the depressions in zones A & B are arranged in regular, repeating patterns.

With the system of FIG. 19, different sets of polymeric structures may be formed on a single substrate or different substrates using different thermoplastic compositions. As a result, the thermoplastic compositions may be selected for any of a number of different properties related to manufacturing or end-use performance of the finished articles made using the composite webs.

Figure 20:
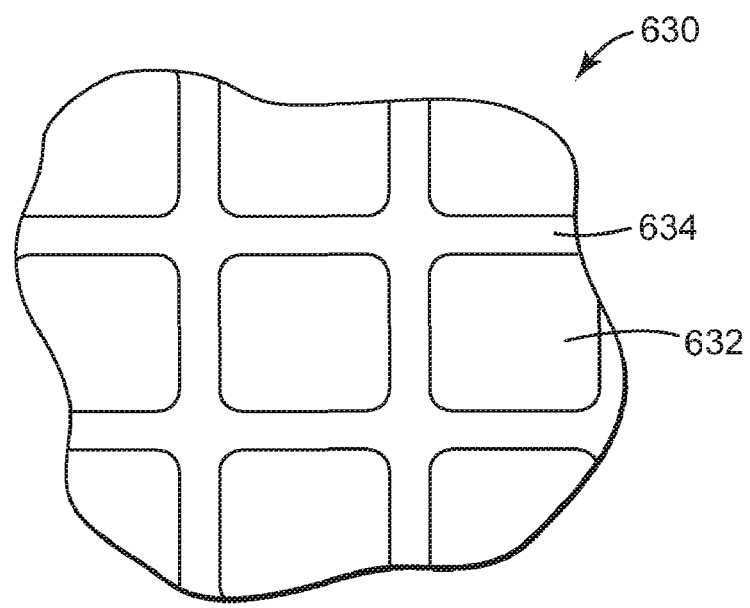
FIG. 20 is a plan view of a portion of an exterior surface of a forming roll with a patterned depression formed therein.

FIG. 20 is a plan view of a portion of a forming roll 630 that may be used in connection with the present invention. The roll 630 includes an exterior surface 632 with a patterned depression 634 formed therein. The depression 634 may be, e.g., in the form of intersecting troughs such that a screen-like pattern is formed.

Figure 21:
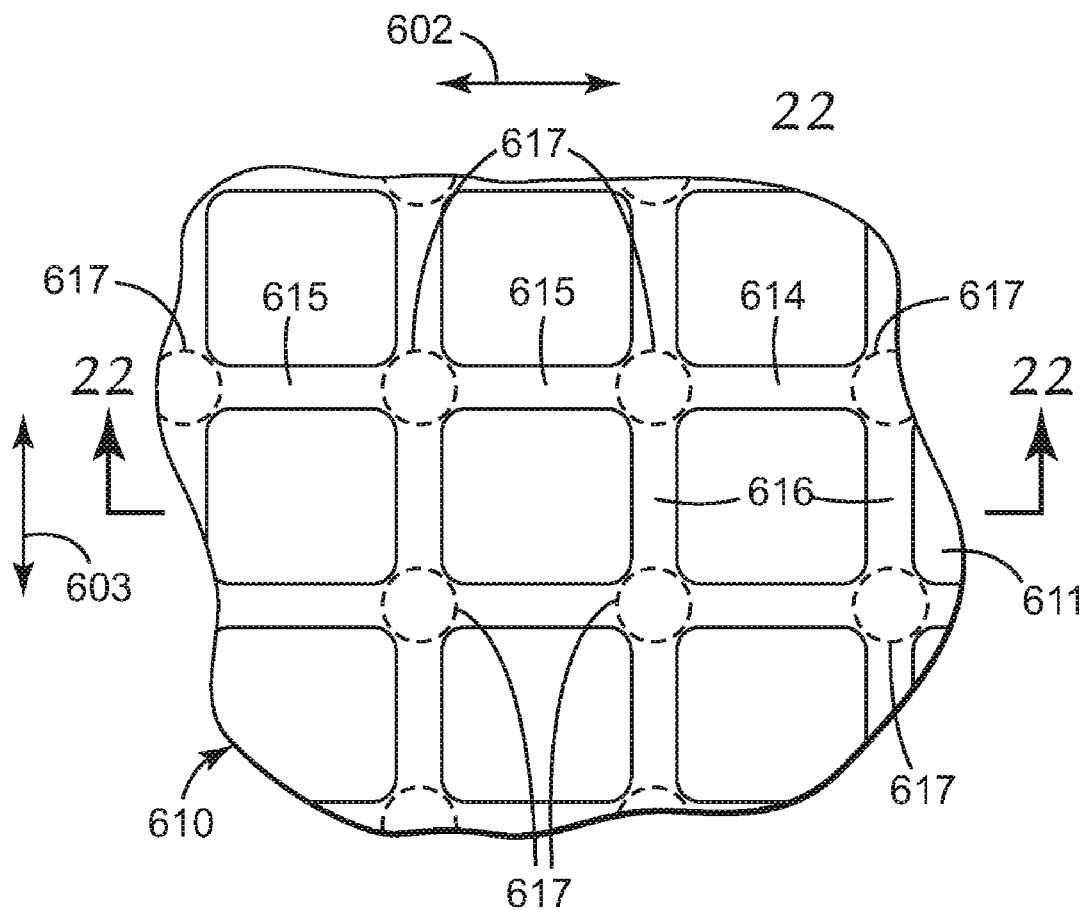
FIG. 21 is a plan view of a composite web including a polymeric structure formed thereon using the forming roll of FIG. 20.
Figure 22:
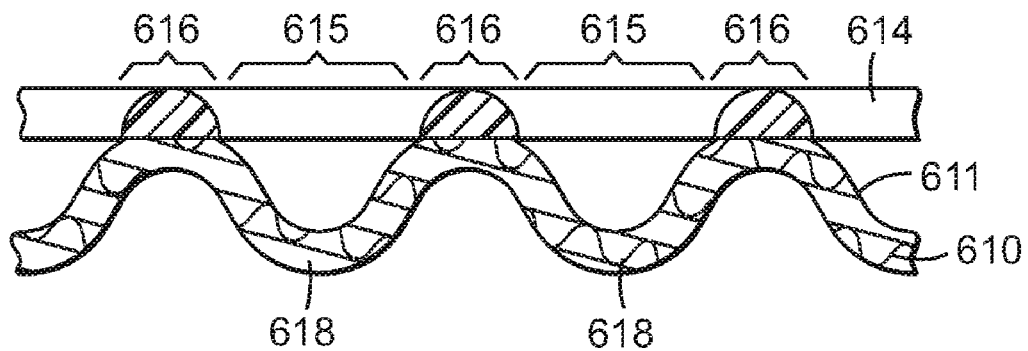
FIG. 22 is a cross-sectional view of the composite web of FIG. 21 after stretching.

FIGS. 21 and 22 depict a composite web that may be manufactured using the forming tool 630 of FIG. 20, with FIG. 21 being a plan view of the article and FIG. 22 being a cross-sectional view of the composite web taken along line 22-22 in FIG. 21. The polymeric structure 614 includes segments 616 that are attached to the surface 611 of the substrate 610 (see, e.g., FIG. 22) and segments 615 that are not attached to the surface 611 of the substrate 610. It may be preferred that the portions 618 of the substrate 610 opposite the unattached segments 615 form arcuate channels spaced from the polymeric structure 614.

Also, although not depicted, all or portions of the polymeric structure 614 may include surface features formed on the upper surface thereof (as described in connection with, e.g., FIGS. 12 and 13).

The composite web of FIGS. 21 and 22 may be formed by, e.g., transferring an elastomeric thermoplastic composition to the substrate 610. The elastomeric thermoplastic composition may preferably form a polymeric structure 614 that exhibits elasticity. It may further be preferred that the polymeric structure 614 exhibit differential bonding to the substrate 610 such that portions of the substrate 610 are attached more securely to the polymeric structure 614 than other portions. For example, it may be preferred that the intersections between the various strands or segments of the polymeric structure 614 be attached more securely than the intervening segments. These more secure attachment points may be the result of a locally increased mass of molten thermoplastic composition as discussed above in connection with FIGS. 6-13.

In addition, it may be preferred that the substrate 610 be manufactured of a non-elastomeric material or an elastic material that has a yield point below that of the elastomeric polymeric structure 614. After transfer of the thermoplastic composition, the substrate 610 (with the polymeric structure 614 formed thereon) can be stretched in the directions of arrow 602 (see FIG. 21). The stretching is preferably sufficient to cause the substrate 610 to release from the polymeric structure 614 along at least some of the segments 615 and result in the gathers or puckers seen in FIG. 22.

The stretching is also preferably sufficient to cause permanent elongation of the substrate 610 that provides the additional length needed to form the arcuate portions 618 after the stretching force is released. The polymeric structure 614 itself may experience some permanent elongation as a result of the stretching, but its magnitude will be below that of the substrate such that the arcuate portions 618 are formed as seen in FIG. 22.

Although the substrate 610 is preferably extensible, a non-extensible substrate 610 can be made extensible by, e.g., providing slits in the substrate. The slits may preferably be spanned by the elastomeric polymeric structure 614. Some exemplary slitting processes to provide or improve extensibility of a substrate are described in International Publication No. WO 96/10481 (Abuto et al.). Other techniques may also be used to provide or improve the extensibility of substrates used in connection with the present invention. For example, the mechanical stretching processes described in U.S. Pat. Nos. 4,223,059 (Schwarz) and 5,167,897 (Weber et al.) may be used to provide or improve extensibility.

In addition to stretching in direction 602, it may also be beneficial to stretch the composite web in the direction of arrow 603 in FIG. 21. The resulting two-dimensional stretching may cause the substrate to permanently elongate in both directions, with the substrate forming pillow-like structures between the intersection points in the polymeric structure 614.

As another alternative to obtain the composite web of FIG. 22, it may be possible to use a substrate 610 that is, itself, elastic. Such an elastic substrate may be stretched in the machine direction and/or one or more different directions before the polymeric structure 614 is transferred thereto. After formation of the polymeric structures on the stretched elastic substrate 610, the substrate 610 may be allowed to relax such that the arcuate portions 618 are formed.

Composite webs such as those depicted in FIGS. 21 and 22 may be useful as, e.g., elastic components for disposable articles, diapers, incontinence devices, gowns, clothing, filtration devices, etc.

Figure 23:
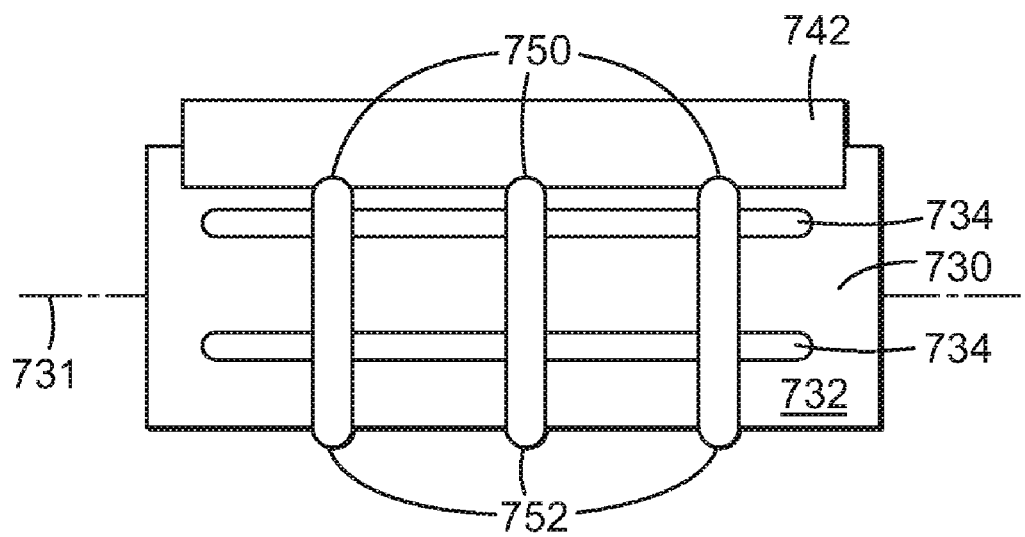
FIG. 23 is an alternative system for producing a polymeric structure on a composite web similar to that depicted in FIG. 20.

As an alternative to the patterned depression of FIG. 20, the polymeric structure 614 of FIGS. 21 and 22 may be formed by the system and method depicted in FIG. 23. The system includes a forming roll 730 with an exterior surface 732. A series of depressions 734 are formed in the exterior surface 732 of the forming roll 730. One feature illustrated in FIG. 23 is that the doctor blade 742 includes notches 750 such that, after wiping, a portion of the molten thermoplastic composition passes through the interface between the doctor blade 742 and the roll 730 and remains on the exterior surface 732 of the roll 730 in a series of strands 752 that extend around a portion of the circumference of the roll 730. In that manner, the cross-hatched pattern of FIGS. 21 and 22 can be obtained without requiring a patterned depression that corresponds precisely to the shape of the polymeric structure 614.

Figure 24:
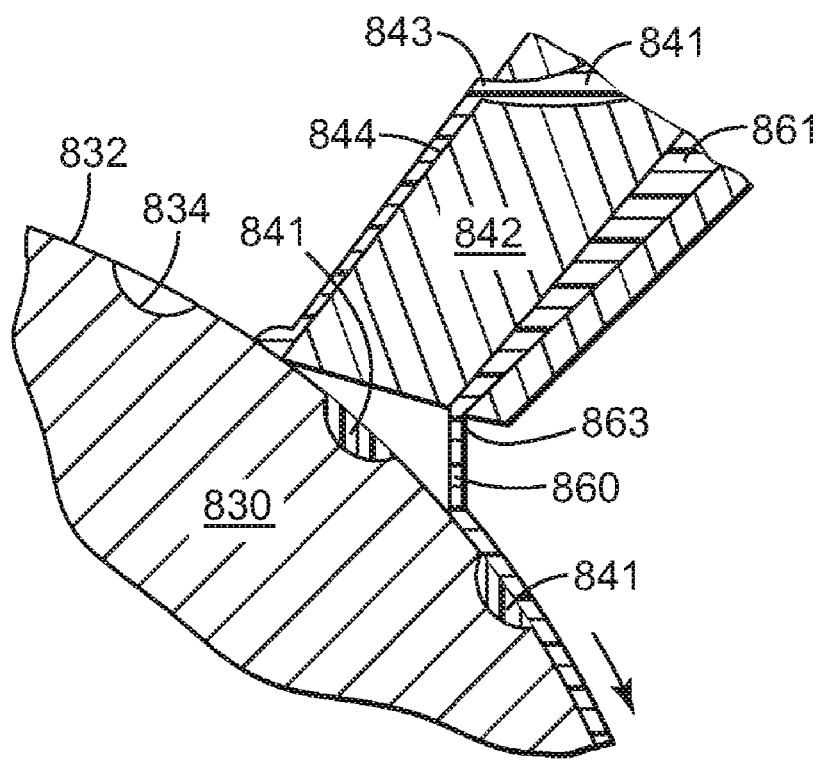
FIG. 24 is another alternative system for producing a polymeric structure on a composite web similar to that depicted in FIG. 20.

FIG. 24 depicts yet another system and method that may be used in connection with the present invention. The system includes a forming roll 830 with an exterior surface 832 and depressions 834 formed therein. In a manner similar to that described in connection with FIGS. 16 and 17, the system includes a doctor blade 842 that functions as an extrusion die in addition to a doctor blade. The doctor blade includes an orifice 843 from which a first molten thermoplastic composition 841 is extruded. The molten thermoplastic composition 841 flows down the face 844 of the doctor block 842 until it reaches the interface with the roll 830. At that point, the molten thermoplastic composition 841 fills the depressions 834.

In addition to the extrusion of molten thermoplastic composition 841, the doctor block 842 of FIG. 24 also includes an optional orifice 863 through which a second molten thermoplastic composition 861 flows onto the exterior surface 832 of the forming roll 830. The second molten thermoplastic composition 861 may preferably be provided in the form of generally continuous strands 860 as the roll 830 rotates in the direction of the depicted arrow. The second molten thermoplastic composition 861 may be the same as or different than the first molten thermoplastic composition 841.

Other variations include that the depressions 834 may be limited in size or they may extend across the roll face (as seen in, e.g., FIG. 23). If the depressions 834 extend across the roll face as seen in FIG. 23, then the system of FIG. 24 provides another alternative system and method form forming a polymeric structure such as that seen in FIGS. 21 and 22. One potential advantage of the system of FIG. 24 is that the molten thermoplastic compositions 841 and 861 may be different to supply, e.g., different properties to the resulting composite web.

Regardless of the method used to form the polymeric structure 614 of FIG. 21, the polymeric structure 614 may exhibit differential bonding as described herein due to the increased mass of thermoplastic composition at the intersections between the segments 615 and 616. Those areas of increased mass may form bonded areas 617 (see FIG. 21) that are securely attached to the substrate 610, while the segments 615 and 616 may or may not be securely attached to the substrate 610, that is, they may be detached areas. The detached areas may be lightly attached to the substrate immediately after transfer of the polymeric structure thereto, but become detached from the substrate 610 after stretching or other physical manipulation (e.g., bending, flexing, etc.). Alternatively, the detached areas may be formed by thermoplastic composition that falls below the melt processing temperature before contacting the substrate 610 such that no bond is formed during transfer of the polymer structure 614 to the substrate.

FIGS. 25A-25E depict alternate composite web constructions in which two different thermoplastic compositions in different polymeric structures are transferred to a substrate or in which the same thermoplastic composition is applied in two different structures on a substrate. The constructions are provided to illustrate that the transfer methods of the present invention can be used to provide different polymeric structures that overlap each other on the same area of the substrate in some manner. In one example, one of the polymeric structures may exhibit elastic behavior while the other does not.

Although only two different structures are depicted in each figure, it will be understood that more than two different polymeric structures could be provided. Also, surface features such as those depicted in FIG. 13 may be provided on the polymeric structures if so desired. Furthermore, although only one set of polymeric structures is depicted in each figure, each composite wed may include a plurality of the same or different polymeric structures. The different polymeric structures may, for example, be applied by successive stations such as the station depicted in FIG. 15.

Figure 25A:
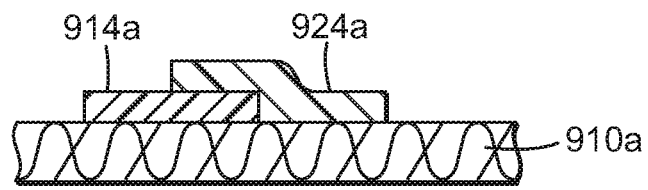
FIGS. 25A-25E are cross-sectional views of portions of alternative composite webs with two different thermoplastic compositions located on a surface of a substrate.

FIG. 25A depicts a first polymeric structure 914*a* on the substrate 910*a* and a second polymeric structure 924*a* that is located on both the substrate 910*a* and the first polymeric structure 914*a*. The second polymeric structure 924*a* may be attached to the first polymeric structure 914*a* or not as desired.

Figure 25B:
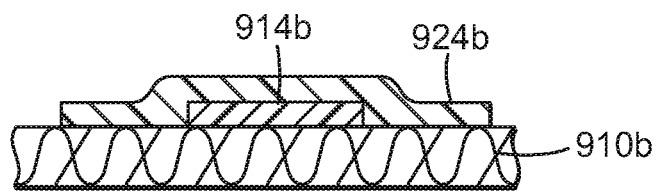

FIG. 25B depicts a first polymeric structure 914*b* on the substrate 910*b* and a second polymeric structure 924*b* that is located on both the substrate 910*b* and over the first polymeric structure 914*b*. The second polymeric structure 924*b* is depicted as attached to the upper surface of the first polymeric structure 914*b*.

Figure 25C:
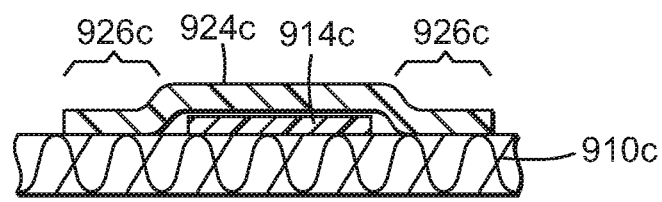

FIG. 25C depicts a first polymeric structure 914*c* on the substrate 910*c* and a second polymeric structure 924*c* that is attached to the substrate 910*c* in areas 926*c* and that extends over the first polymeric structure 914*c*. The second polymeric structure 924*c* is depicted as detached from the upper surface of the first polymeric structure 914*c*.

Figure 25D:
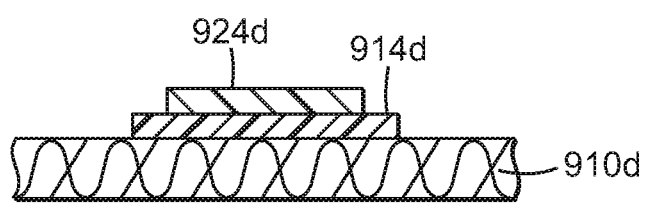

FIG. 25D depicts a first polymeric structure 914d attached directly to the substrate 910d and a second polymeric structure 924d that is located on only the first polymeric structure 914d, that is, within the footprint of the first polymeric structure 914d on the substrate 910d. The second polymeric structure 924d is depicted as attached to the upper surface of the first polymeric structure 914d.

Figure 25E:
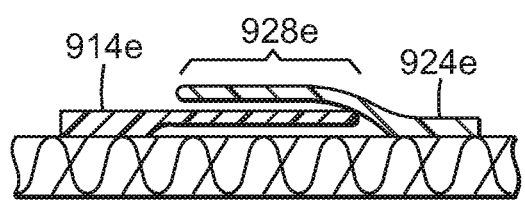

FIG. 25E depicts a first polymeric structure 914e and a second polymeric structure 924e, both attached to the substrate. Both structures include detached portions that are generally located within area 928e in FIG. 25E. The first polymeric structure 914e includes a portion that is attached to the substrate and a portion that is detached from the substrate. The detached portion of the first polymeric structure 914e is generally located under a portion of the second polymeric structure 924e. The second polymeric structure 924e also includes a portion that is attached to the substrate and a portion that is detached from the substrate. The detached portion of the second polymeric structure 924e is generally located over the first polymeric structure 914e.

In addition to the deposition of nonelastic or elastic thermoplastic polymeric structures on a substrate, it is also contemplated that additional materials can be coated onto a major surface of the substrate using known methods. Such materials could be, for example adhesives, as described in, e.g., U.S. Pat. Nos. 5,019,071 (Bany et al.); 5,028,646 (Miller et al.); and 5,300,057 (Miller et al.); or cohesives as described in, e.g. U.S. Pat. Nos. 5,389,438 (Miller et al.) and 6,261,278 (Chen et al.).

Closure Element Systems

Although there exist in the art many types of structures that provide connections between substrates, and many systems of elements that provide closures, there continues to be a need for improved closure elements and systems. The polymeric structures and composite webs described herein may be used to provide closure elements and systems. For example, as discussed above, polymeric structures such as depicted in FIG. 13, provided by a forming tool such as depicted in FIG. 12, may provide surface features 352 useful in mechanical fastening systems. Additionally, certain composite web constructions, such as that depicted in FIG. 25E, may provide mechanical fastening by, for example, securing materials, such as fibers, loops, etc., between the detached portion of the polymeric structure 914e, to provide a closed orientation. Some further exemplary closure elements and systems are described below; however, it is understood that closure elements and systems as contemplated by the present invention are not to be limited to the embodiments described herein.

Composite webs including thermoplastic polymeric structures attached to substrates as described herein may advantageously provide closure elements and systems including, but not limited to, low profile in-plane closure elements and systems, with the polymeric structures providing the closure elements. Such elements may, for example, provide closure by engaging with fibers of a loop material, by engaging with a loop-like material provided by extrusion processes described herein, by a self-mating design as described herein, etc.

Closure elements and closure systems of the present invention may typically include a composite web provided as disclosed herein, wherein the composite web includes a substrate with a first major surface and one or more polymeric structures of a thermoplastic composition attached to the first major surface of the substrate. Such polymeric structures may provide closure elements of the closure systems of the present invention. In the present systems, each polymeric structure of the one or more polymeric structures occupies an area of the first major surface of the substrate. Such area occupied by the polymeric structure preferably includes a bonded area, or attachment area, in which the thermoplastic composition of the polymeric structure is attached to the first major surface. The area occupied by the polymeric structure further includes at least one detached area in which the polymeric structure is not attached to the first major surface of the substrate.

The composite webs of the invention that provide closure elements and closure systems may optionally include materials such as have been already disclosed herein. For example, the first major surface of the substrate may include polymeric material having a melt processing temperature at or below a melt processing temperature of the thermoplastic composition of the one or more polymeric structures. The composite web may also include a polymeric material in the form of a polymeric film.

Additionally, attachment of the polymeric structures to form closure elements and systems of the invention may include structures and methods disclosed herein. For example, the invention may include a composite web including a substrate having a first major surface that includes a porous surface, and wherein the thermoplastic composition in the bonded areas of the one or more polymeric structures infiltrates into the porous first major surface of the substrate to a depth of, e.g., at least 50% of a thickness of a porous portion of the substrate. The first major surface of the substrate may, additionally, include fibers, preferably polymeric fibers, having a melt processing temperature at or below a melt processing temperature of the thermoplastic composition of the one or more polymeric structures and wherein at least a portion of at least some of the fibers are encapsulated in the thermoplastic composition within the bonded area. Embodiments further include composite webs providing closure element and systems wherein each polymeric structure, or a portion thereof, of the one or more polymeric structures includes a one piece, completely integral mass of the thermoplastic composition.

It is further contemplated that the composite webs of the invention also may include embodiments wherein the thermoplastic composition of the one or more polymeric structures includes one or more elastomeric polymeric components such that the one or more polymeric structures exhibit elastic behavior. Additionally, the composite webs of the invention may include at least one of the one or more polymeric structures which has an upper surface facing away from the first major surface of the substrate, and wherein the upper surface includes surface features, such as stems or pins protruding therefrom, formed thereon.

The methods of providing composite webs, as previously disclosed herein, also serve to provide methods for providing closure elements and systems of the invention. For example, a method of attaching articles, such as the polymeric structures attached to substrates as discussed above is contemplated, wherein the method includes providing a composite web as disclosed herein which includes, for example, a substrate having a first major surface and one or more polymeric structures of a thermoplastic composition attached to the first major surface of the substrate, wherein each polymeric structure of the one or more polymeric structures occupies an area of the first major surface of the substrate, and the area occupied by the one or more polymeric structures includes a bonded area, in which the thermoplastic composition of the polymeric structure is attached to the first major surface in any suitable manner and the occupied area further includes a detached area in which the polymeric structure is not attached to the first major surface of the substrate.

Substrates, thermoplastic materials, methods of forming the composite webs including thermoplastic polymeric structures, and shape and disposition on the webs of the polymeric structures may be any described herein that are suitable to provide closure elements and systems. Additionally, the polymeric structure closure elements may be attached to the substrate in any suitable manner described herein. Useful techniques of attaching closure elements include, for example, preparing closure elements using a cell in a gravure roll that provides a thicker region that will retain sufficient heat to fuse to a compatible substrate. One example of such a method is described herein in connection with FIGS. 12 and 15. If the substrate surface includes a fiber based material, such as a nonwoven or woven material, this region may flow into the substrate and encapsulate the fibers, thereby using the various depths of the gravure cells to achieve bonded and detached areas. Another potential method may involve an extrusion process wherein grooves are cut into a doctor blade to yield zones of molten polymer deposited on the gravure roll in an overlapping configuration with the gravure cells. One example of such a method is described herein in connection with FIG. 23. This provides thicker regions of polymer that retain sufficient heat and fluidity to bond to substrates as well as the closure elements.

Figure 26A:
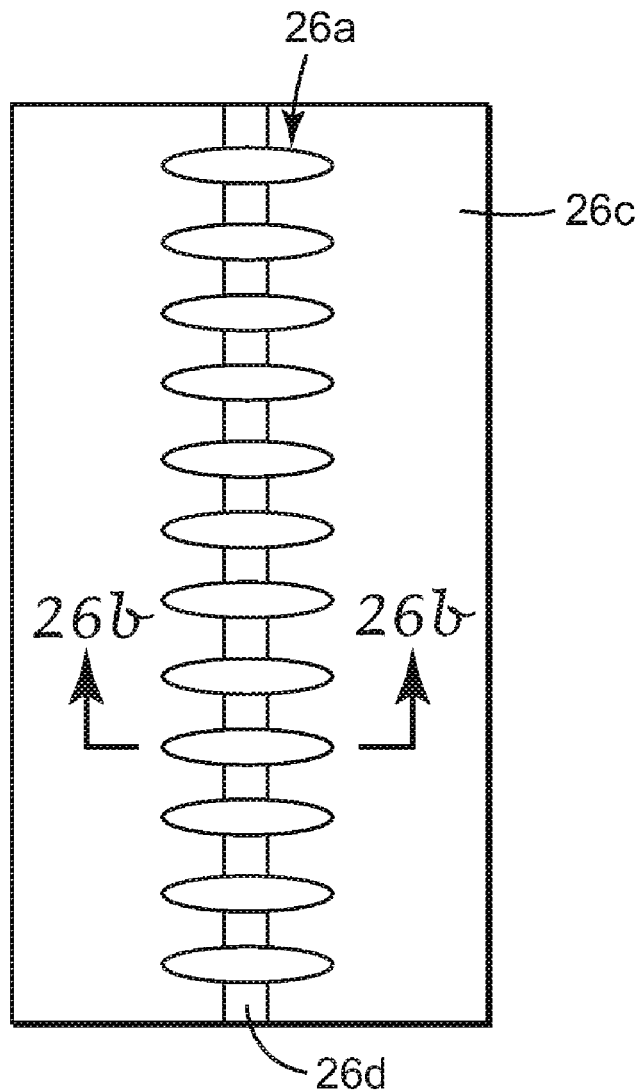
FIGS. 26a-26b depict a composite web including oval shaped closure elements.
Figure 26B:
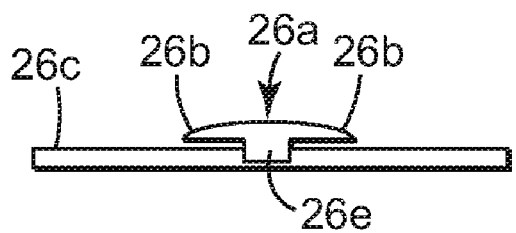

FIGS. 26a-26b depict one composite web construction according to the present invention including oval shaped closure elements 26a with detached end areas 26b. FIG. 26a shows a plan view of a substrate including the oval shaped closure elements 26a attached to the first major surface of the substrate 26c. The closure elements 26a are attached to the substrate in a bonded area 26d that extends between the detached areas 26b of the oval shaped closure elements 26a. Alternatively, it is appreciated that the oval shaped closure elements 26a may be attached to the first major surface of the substrate 26c as separate, discrete closure elements that are not connected to each other by bonded area 26d. Furthermore, the oval shaped closure elements 26a may be attached to the substrate 26c in any one of multiple configurations, e.g., in a regular pattern, in an irregular pattern, in a random pattern, closure elements attached over the entire surface of the substrate 26c, or only on a portion of the substrate 26c, etc.

FIG. 26b is a cross-sectional view of a single oval shaped element 26a, taken along the line 26b-26b shown in FIG. 26a. FIG. 26b depicts the center section of the closure element 26a, which may preferably penetrate into the substrate at attachment point 26e, and two portions 26b that are detached from the substrate 26c. The portions 26b of the depicted closure element 26a are cantilevered over and aligned with the first major surface of the substrate 26c.

The term "cantilevered" (and variations thereof) is understood herein to mean a member or a portion of a closure element that is projected over the substrate, wherein the member or portion of the closure element is supported at only one end. A detached and cantilevered area of a closure element may have an orientation that is aligned with the first major portion of the substrate as depicted in, e.g., FIG. 26b. That is, the detached and cantilevered portions 26b of closure element 26a may be substantially parallel to the surface of the substrate 26c. Alternatively, the detached and cantilevered portions 26b may be oriented in such a manner that the member is not substantially parallel to the surface of the substrate. Use of the term "cantilevered" (and variations thereof) is not meant to imply that the cantilevered portion of any polymeric structure is not in contact with the substrate surface above which it is cantilevered. Rather, in some instances the cantilevered portion may be in contact with the underlying substrate surface (but not attached thereto) and in other instances, the cantilevered portion may not be in contact with the underlying substrate surface.

The cross-sectional view, as depicted in FIG. 26b, shows an oval shaped polymeric closure element 26a occupying an area of the surface of the first major surface of the substrate 26c, wherein the element includes a bonded area 26e attached to the surface of the substrate 26c and detached area 26b that is not attached to the substrate 26c. Furthermore, in the detached area 26b, the depicted polymeric closure element is cantilevered over and is aligned with the first major surface of the substrate 26c.

Closure elements such as those depicted in FIG. 26 may preferably be capable of engaging with loop material, when the closure elements are appropriately sized. Such closure elements may typically possess shear resistance, i.e., the ability to limit sliding motion between two substrates, but the closure elements may not exhibit strong peel forces. To prepare closure elements of the invention having both increased shear resistance, and increased peel characteristics, the polymeric closure elements may include barb structures.

Figure 27A:
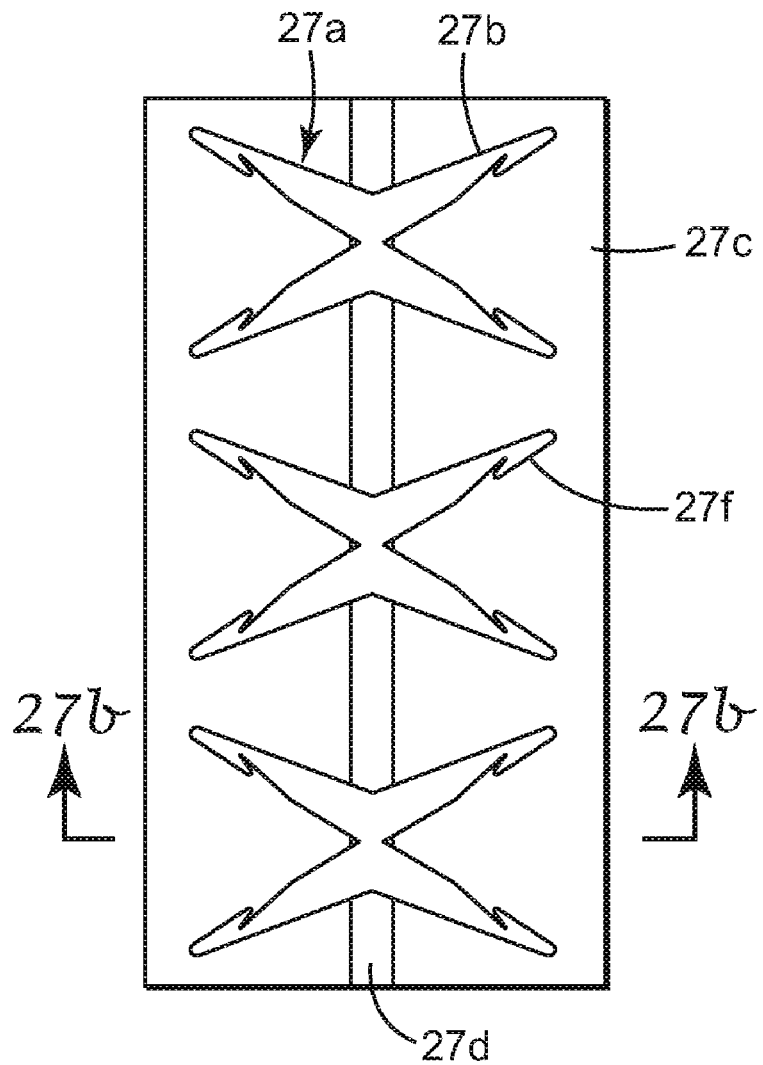
FIGS. 27a-27b show a composite web including closure elements having barbs.
Figure 27B:
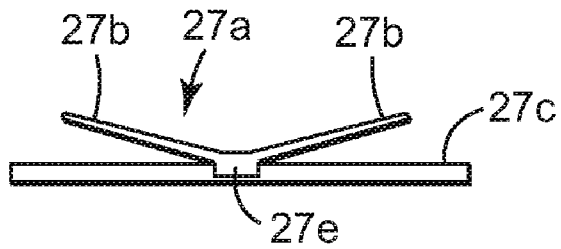

One example of polymeric closure elements including barb structures is depicted in FIGS. 27a-27b. FIG. 27a is a plan view of a substrate including closure elements 27a including barb structures 27f. The closure elements 27a include at least one detached area 27b and are attached to a first major surface of a substrate 27c at a bonded area 27e. The detached areas 27b are cantilevered over the first major surface of the substrate 27c and may be characterized as stems having a free end supported above the first major surface of the substrate 27c.

The closure elements 27a are connected to each other by bonded areas 27d that extend between the closure elements 27a. Alternatively, it is appreciated that the closure elements 27a may be attached to the first major surface of the substrate 27c as separate and discrete elements, i.e., without interconnection by bonded areas 27d. Furthermore, the closure elements 27a may be attached to the substrate 27c in any one of multiple configurations, e.g., in a regular pattern, in an irregular pattern, in a random pattern, closure elements attached over the entire surface of the substrate 27c, or only on a portion of the substrate 27c, etc.

As depicted in FIG. 27a, each of the closure elements 27a includes a barb structure 27f on the detached area 27b. Alternatively, it is envisioned that some of the closure elements 27a may include barb structures 27f on only some of the detached areas 27b. Furthermore, certain embodiments may include closure elements 27a having no barb structures 27f. As depicted in FIG. 27a, the closure elements 27a each include four distinct detached areas 27b. Alternatively, some or all of the closure elements 27a may include either more or fewer than four distinct detached areas 27b.

Also, the barb structure 27f is depicted proximate a distal end of the detached area 27b from the bonded area 27e. It is understood, however, that the barb structure 27f may be located at any point along the detached area 27b, that the position of the barb structure 27f may vary from one detached area 27b to another, and that the position of the barb structure 27f may vary from one closure element 27a to another.

As understood herein, a barb is a structure extending outward in a first direction and including a projection extending substantially in a second direction ranging from perpendicular to the first direction to substantially opposite the first direction. Such elements may be well suited to engaging fibers of a loop material, for example, to provide closure elements having increase peel and shear characteristics, as compared with closure elements that do not include barbs.

Additionally, closure elements 27a may include detached areas 27b that are cantilevered as depicted in FIG. 27b. Such cantilevered and detached areas 27b may or may not be aligned with the first major surface of the substrate 27c. FIG. 27b is a cross-sectional view of a closure element 27a of FIG. 27a taken along line 27b-27b depicted in FIG. 27a. In this embodiment, the detached areas 27b of element 27a are cantilevered and are not aligned with the substrate surface 27c, instead being inclined away from the surface of substrate 27c. Providing detached areas 27b that are not aligned with the major surface of the substrate 27c may require additional processing beyond formation of the closure elements 27a using a tool roll as described herein. For example, the detached areas 27b may need to be deformed from their shape as formed by, e.g., manipulating the detached areas 27b using counter-rotating rolls, brushes, a vacuum assembly, etc. In another example, the substrate 27c may be directed over a sharp edge immediately after forming the closure elements 27a.

Figure 28A:
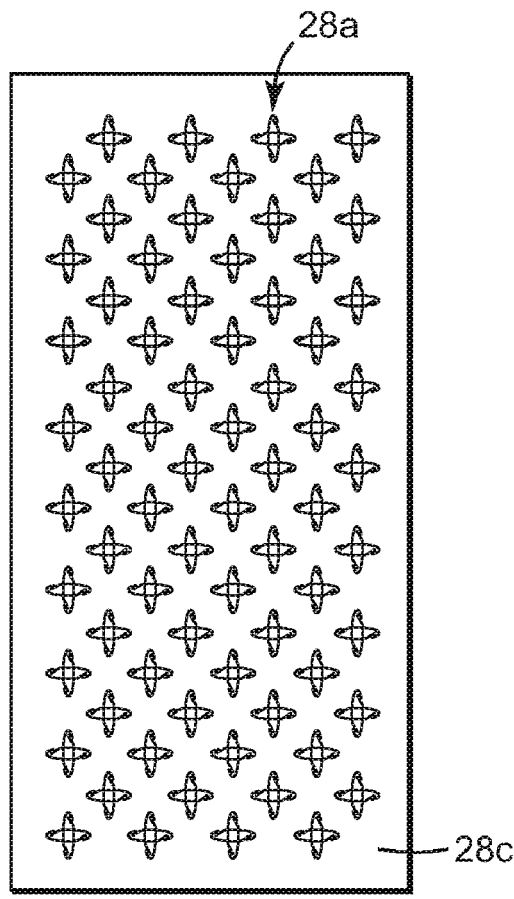
FIGS. 28a-28c show an additional embodiment of the composite webs of the invention having closure elements including barbs.
Figure 28B:
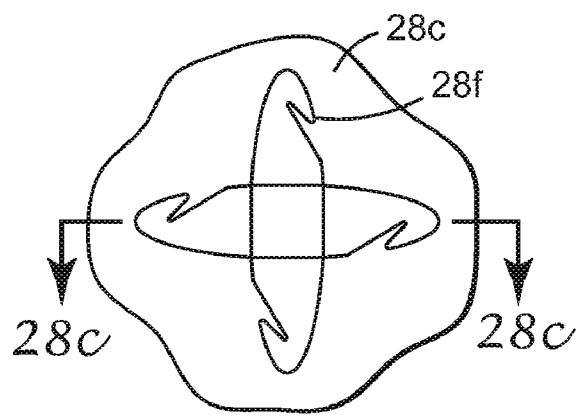
Figure 28C:
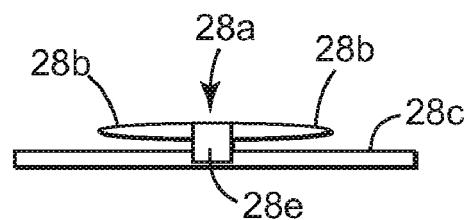

FIGS. 28a-28c show a further embodiment of the composite webs of the invention having closure elements including barbs. FIG. 28a is a plan view of a substrate including a first major surface 28c with separate and discrete closure elements 28a attached thereto. The closure elements 28a include detached areas 28b with barb structures 28f. In the view shown in FIG. 28a, the closure elements 28a are regularly spaced over the surface of the substrate 28c. However, as described in connection with the embodiment depicted in FIG. 27a, the closure elements 28a may be attached to the substrate 28c in any one of multiple configurations, e.g., in a regular pattern, in an irregular pattern, in a random pattern, closure elements attached over the entire surface of the substrate 28c of the substrate, or only on a portion of the substrate 28c, etc. Each of the elements 28a of FIG. 28a, one of which is shown enlarged in FIG. 28b, include a barb structure 28f on the detached areas 28b. Alternatively, it is envisioned that some of the closure elements 28a may include barb structures 28f on only some of the detached areas 28b. Furthermore, certain embodiments may include closure elements 28a having no barb structures 28f. As depicted in FIGS. 28a and 28b, the closure elements 28a each include four distinct detached areas 28b. Alternatively, some or all of the closure elements 28a may include either more or fewer than four distinct detached areas 28b. Also, as depicted in FIG. 28b, the barb structure 28f is depicted at a distal end of the detached area 28b relative to the bonded area 28e. It is understood, however, that the barb structure 28f may be located at any point along the detached area 28b, and that the position of the barb structure 28f may vary from one detached area 28b to another, from one closure element 28a to another, etc.

The composite webs of the present invention may be adaptable to various specific closure requirements, depending on the shape and size of the closure element required. FIGS. 29 and 30, for example, show certain additional contemplated embodiments of the composite webs of the invention, including various shapes of closure elements that may serve any one of a number of various requirements.

Figure 29A:
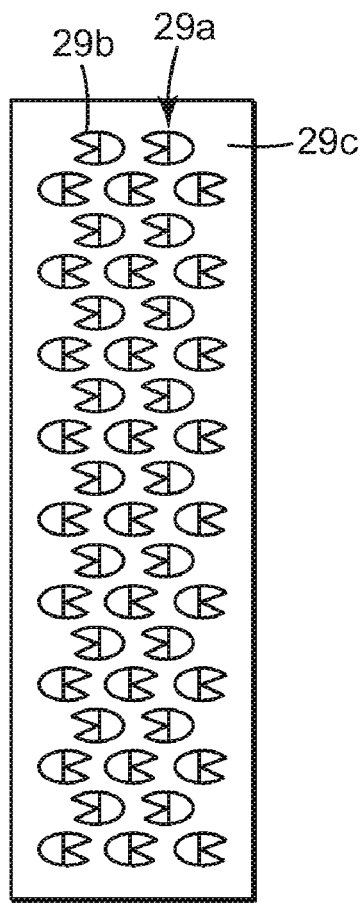
FIGS. 29A-29C show additional embodiments of the composite webs of the invention including closure elements.
Figure 29B:
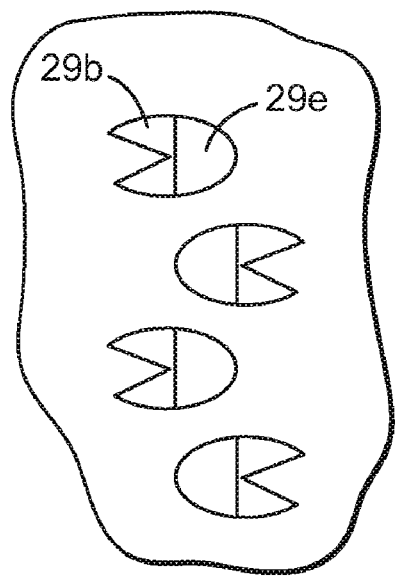
Figure 30:
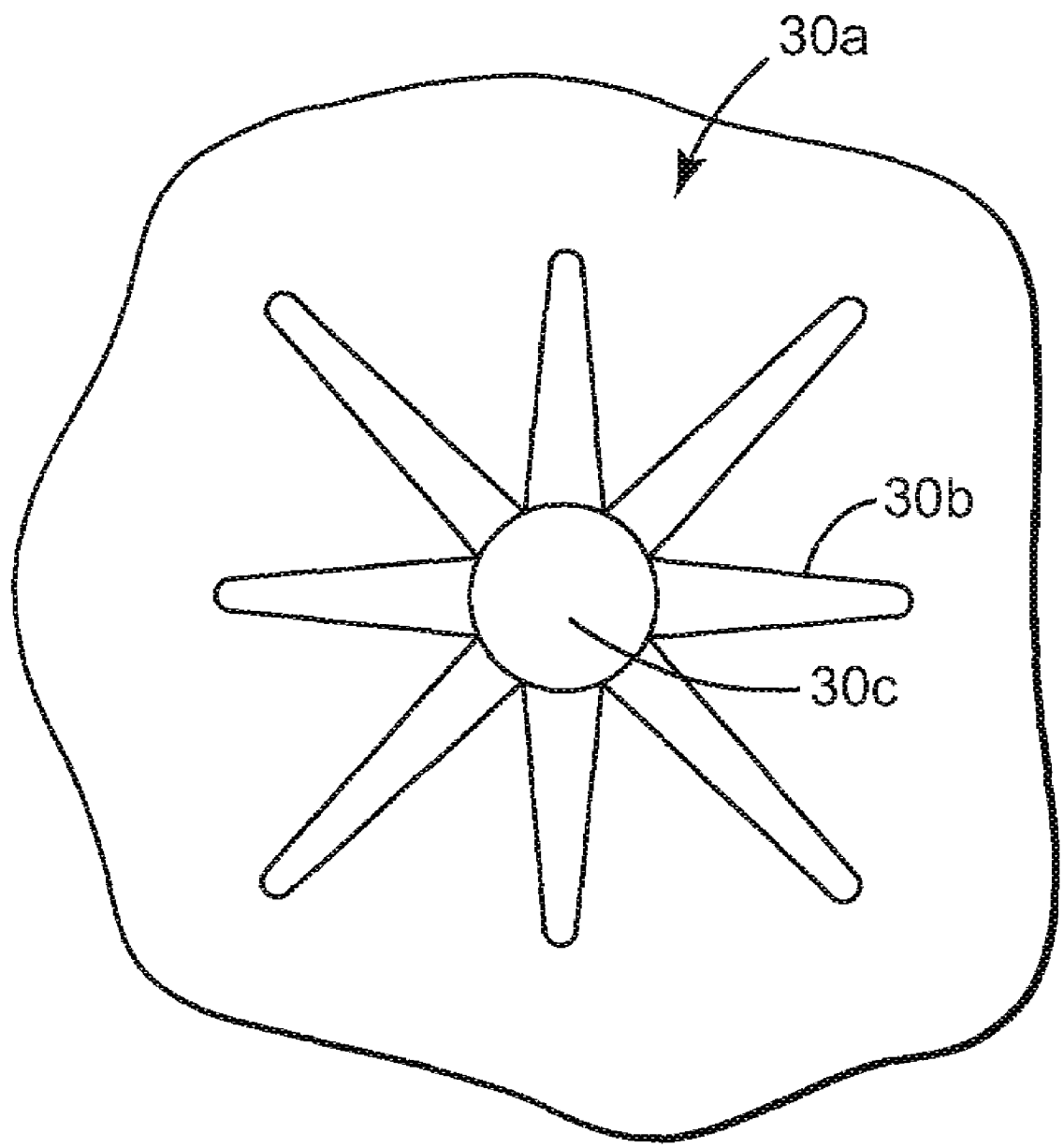
FIG. 30 shows a plan view of the composite webs of the invention including an alternative shape of the individual closure elements.

FIG. 29A shows a plan view of a substrate including a first major surface 29c and further including discrete closure elements 29a attached thereto at bonded areas 29e (see FIG. 29B). In this embodiment, the closure elements 29a include at least one detached area 29b on only one side of the bonded area 29e of the element. The detached area 29b may include a single distinct area, as in a tab, or it may include more than one distinct member, as depicted in FIG. 29B.

In the view shown in FIG. 29A, the closure elements 29a are regularly spaced in a regular pattern over the surface of the substrate 29c. However, as described in connection with, for example, the embodiment depicted in FIG. 27a, the closure elements 29a may be attached to the substrate 29c in any one of multiple configurations, e.g., in a regular pattern, in an irregular pattern, in a random pattern, closure elements attached over the entire surface of the substrate 29c, or only on a portion of the substrate 29c, etc.

Figure 29C:
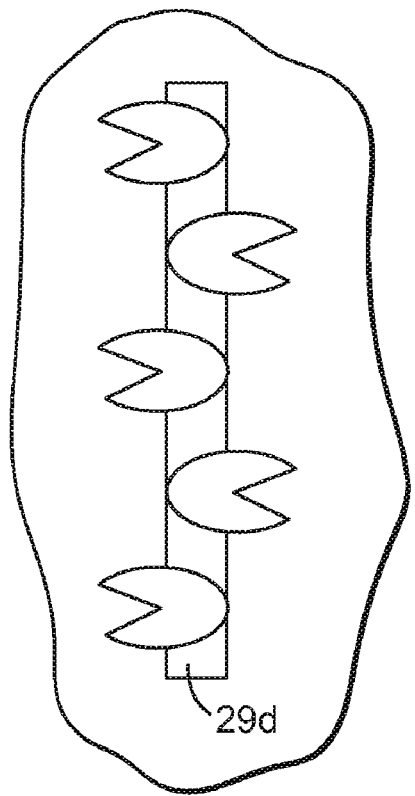

Furthermore, as depicted in FIG. 29C, the closure elements 29a, may be connected to each other by a bonded area 29d that extends between the bonded areas 29e of the closure elements 29a, such as described in connection with the embodiments shown in FIGS. 26 and 27.

As shown in FIG. 30, it is further contemplated that the closure elements of the present invention may include multiple detached areas on multiple sides of the bonded area of the closure element, depending on the closure requirements and any physical constraints that may be present. For example, the closure element 30a of FIG. 30 includes eight distinct detached areas 30b extending from bonded area 30c. Closure elements of the invention may include more or fewer distinct detached areas of various shapes and sizes, as required.

Figure 31A:
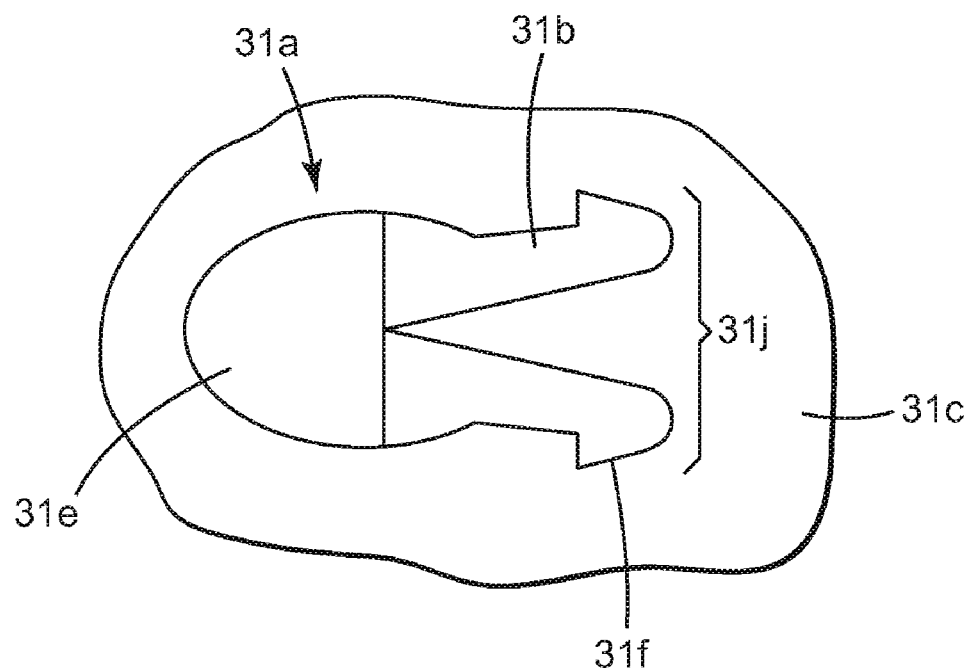
FIGS. 31a-31b show an alternative embodiment of the composite webs of the present invention that provides a closure system. This system includes a closure element having flexible elements.
Figure 31B:
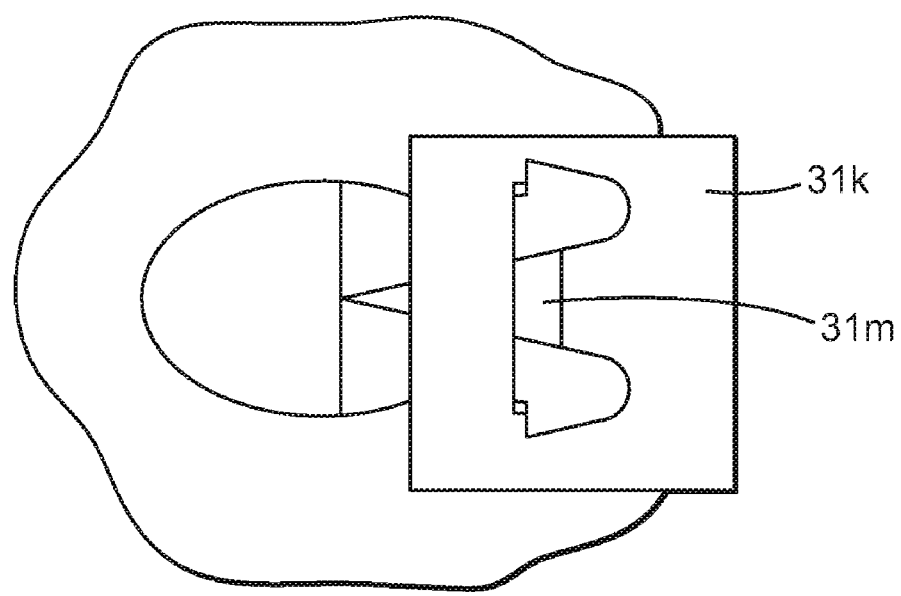

FIGS. 31a-31b depict a further embodiment of a closure system on a composite web of the present invention. This embodiment includes closure elements having thermoplastic polymeric structures including flexible detached areas, providing a spring-type engaging member. FIG. 31a is a plan view of a first major surface of a substrate 31c including a discrete closure element 31a having a detached area 31b that includes a thermoplastic polymeric structure providing a spring-type engaging member 31j. In this embodiment, the discrete closure element 31a includes a bonded area 31e that includes a base in which the thermoplastic polymeric structure is attached to the substrate surface 31c and a detached area 31b on one side of the bonded area 31e that includes one or more cantilevered members in the detached area 31b. The cantilevered members of the detached area 31b are preferably flexible and, further, may include barbs 31f. Additionally, the cantilevered members may either be aligned with the surface of the substrate 31c, or may be inclined either toward or away from the surface of the substrate 31c, depending on the closure requirements.

In addition to the closure element depicted in FIG. 31a, the closure system further includes, as depicted in FIG. 31b, a complementary substrate 31k including one or more openings 31m. The one or more openings 31m in the complementary substrate 31k may be of any shape such as, for example, a round hole, an oval-shaped hole, a rectangular-shaped hole, a slit, etc., so long as the opening 31m is capable of receiving the one or more thermoplastic polymeric structures that form the spring-type engaging member 31j of closure element 31a, such that when the spring-type engaging member 31j is located within the one or more openings 31m of the complementary substrate 31k, the movement of the complementary substrate 31m and the movement of the substrate 31c on which the closure element 31a is attached, relative to each other, is restricted.

FIG. 31b, for example, shows the spring-type engaging member 31j of FIG. 31a in an engaged orientation with a complementary slotted opening 31m in the complementary substrate 31k, which provides a receiving member for the spring-type engaging member 31j. Another complementary surface suitable for engaging the closure elements of FIG. 31a may include, for example openings formed by fiber loops.

Figure 32A:
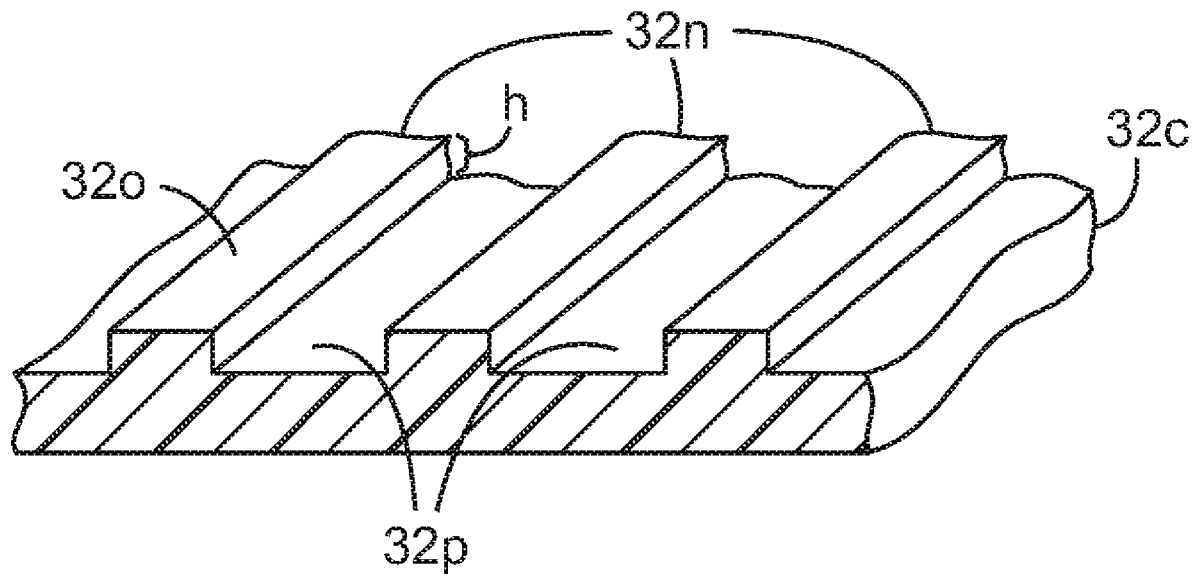
FIGS. 32a-32b show an embodiment of the composite web including raised portions and surrounding valleys.
Figure 32B:
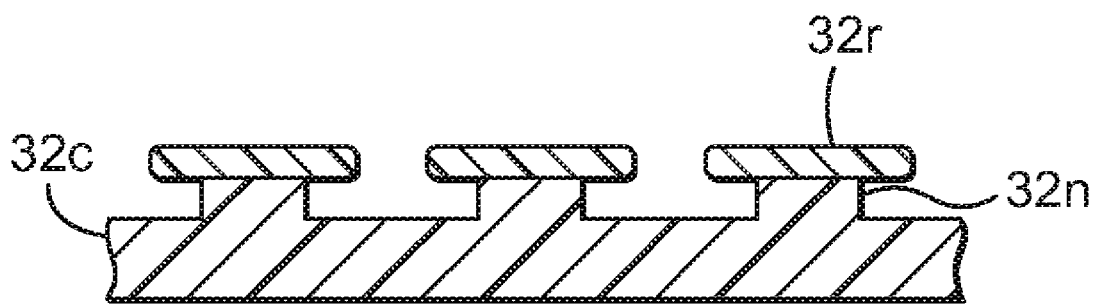

FIGS. 32a and 32b show another contemplated embodiment of the invention, including a composite web having a first major surface of the substrate that includes raised portions and surrounding valleys. The raised portions may include, for example, ridges (as shown), discrete pins, etc. As depicted in FIG. 32a, the first major surface of the substrate 32c may include raised portions 32n, and depressions or valleys 32p between the raised portions 32n. While FIG. 32a shows raised portions 32n having uniform heights, h, from the surface of the valleys 32p, it is understood that embodiments of the invention may also include raised portions 32n having non-uniform heights and raised portions having surfaces 32o which are not substantially parallel to the surface of the surrounding valleys 32p. Such structures including composite webs as depicted in FIG. 32a may optionally be formed as described and with a tool as described in the embodiments disclosed in connection with, for example, FIGS. 6 and 7 above.

FIG. 32 is a view of the structure of FIG. 32a, further including polymeric structures, 32r attached to the raised portions 32n. The polymeric structures 32r may be attached to the raised portions 32n in any appropriate manner, including any manner of bonding or attachment discussed herein. Furthermore, the polymeric structures 32r may include a closure element, including, but not limited to, a closure element of any configuration disclosed herein. Additionally, while FIG. 32b shows an embodiment wherein a polymeric structure 32r is attached to each raised portion 32n, it will be understood that the invention contemplates embodiments wherein not all of the raised portions 32n include polymeric structures 32r attached thereto.

Further, the polymeric structures may be attached to the raised portions 32n of the substrate surface 32c in, e.g., a regular pattern, an irregular pattern, a random pattern, etc. Furthermore, the polymeric structures 32r may be attached to raised portions 32r having a surface 32o that is not substantially parallel to the surface of the surrounding valleys 32p.

Figure 33A:
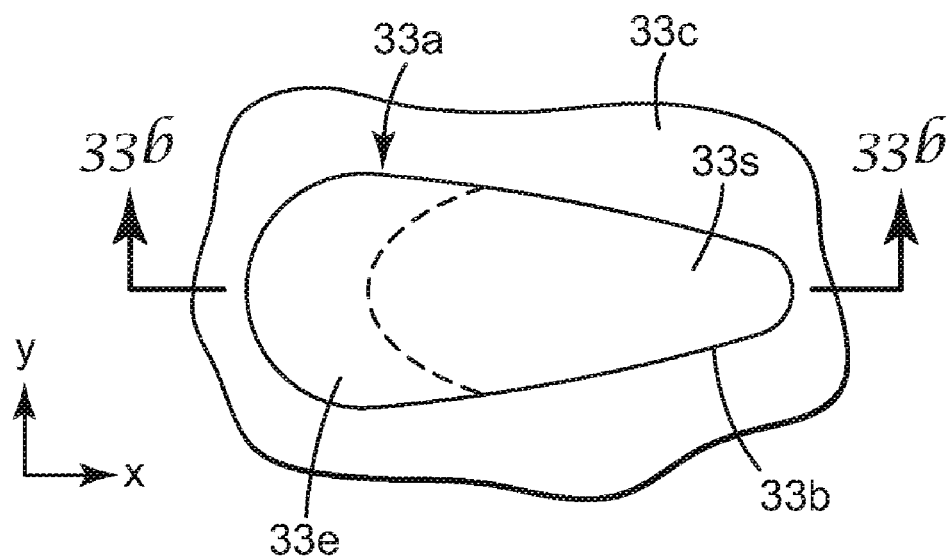
FIGS. 33a-33b show closure elements of a closure system including tabs.
Figure 33B:
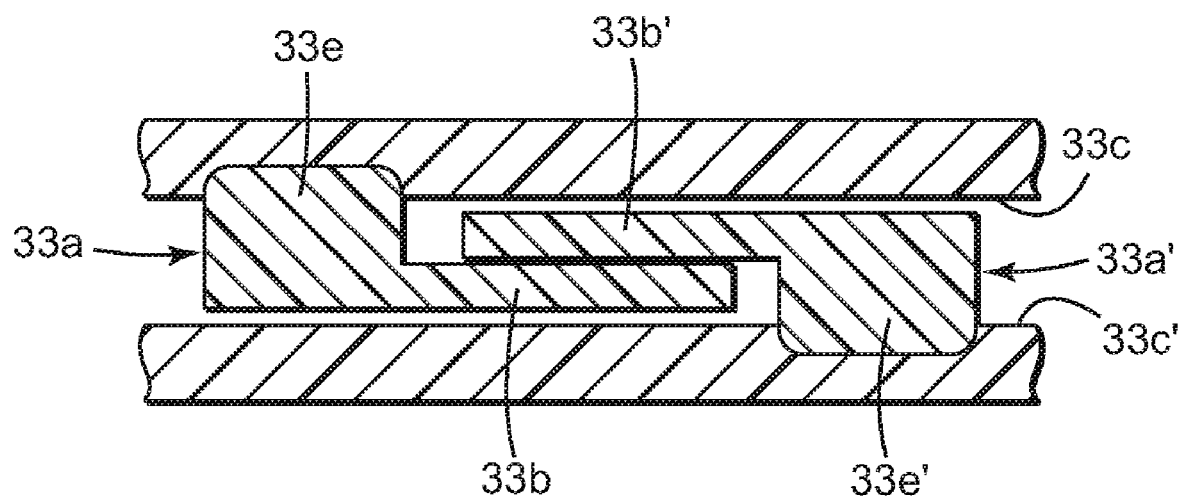

FIGS. 33a and 33b depict a closure system that provides a self-mating system when in a closed configuration. FIG. 33a shows a first closure element 33a attached to a substrate 33c. The closure element 33a includes a bonded area 33e and a detached area 33b on one side of the bonded area 33e. The detached area 33b includes a single member 33s that is cantilevered over and is, preferably, aligned with, the first major surface of the substrate 33c, such that a cantilevered tab structure is formed in the detached area 33b supported above the first major surface of the substrate 33c.

The closure element 33a may preferably be shaped to form a pocket that is bounded on one side by the substrate 33c and on an opposing side by the detached area 33b. Movement of any member in the pocket to the left along the x-axis is prevented by the bonded area 33e. Likewise, for a member completely inserted into the pocket, movement in either direction along the y-axis is similarly restrained by the bonded area 33e (because the end of the member proximate the bonded area 33e would contact the bonded area 33e).

FIG. 33b is a cross-sectional view of FIG. 33a when mated with a complementary second closure element 33a', taken along line 33b-33b of FIG. 33a. The second closure element 33a' is attached to a first major surface of a substrate 33c' and includes a detached area 33b' and a bonded area 33e'. The detached area 33b' provides a cantilevered tab structure, and the bonded area 33e' forms a second pocket in a similar manner as the first pocket formed by the first closure element 33a. As depicted in FIG. 33b, when in a closed configuration, the cantilevered tab of the first closure element 33a is preferably located in the second pocket of the second closure element 33a', and the cantilevered tab of the second closure element 33a' is preferably located in the first pocket of the first closure element 33a, thus providing a closure system wherein the closure elements 33a and 33a' are engaged in a self-mating orientation.

The bonded area of the thermoplastic structure of either the first closure element, the second closure element, or both closure elements, may take any convenient shape, such as a box shape bonded area or a U-shape bonded area that assists in formation of a pocket. Furthermore, the cantilevered tab of the first closure element may be at least partially or substantially completely located within the second pocket, or the cantilevered tab of the second closure element may be at least partially or substantially completely located within the first pocket when the closure elements include, for example, a U-shaped bonded area and when the closure system is in a closed configuration.

Additionally, while the closure system of FIG. 33 depicts a closure system wherein the closure elements both having the same elongated egg shape, the present invention also contemplates closure systems wherein the closure elements are of various shapes and sizes, and wherein the first closure element and the second closure element do not necessarily have the same shape and bonding configuration, so long as the elements provide the required self-mating closure system when oriented in a closed configuration.

EXAMPLES

The following examples are provided to enhance understanding of the present invention. The examples are not intended to limit the scope of the invention.

Example 1

A composite web was produced using a system similar to that shown in FIG. 15. A 40 mm diameter twin screw extruder fitted with a gear pump was used to deliver a molten polypropylene polymer (7C05N, Huntsman) at a melt temperature of approximately 246° C. to a die. The die was positioned such that a film of molten polymer was extruded vertically downward into the interface region of a heated doctor blade and a cooled forming roll.

The doctor blade was forced against the forming roll with a pressure of 93 pounds per lineal inch (163 Newtons per lineal cm) (a pressure which allowed the molten polymer to create a gap between the blade and the roll which defined the thickness of the base film). The doctor blade was maintained at a temperature of 246° C. and the forming roll was maintained at a temperature of 30° C. by circulating cooled oil through the interior of the roll.

The exterior surface of the forming roll was machined using a computer controlled milling machine to have a series of elongated elliptical or ring-shaped depressions with center islands, similar in shape to the depressions shown in FIG. 10. The depressions, however, had a constant depth. There were eight (8) depressions around the periphery of the roll. The depressions were elliptical in shape 8.825 cm long and 2.00 cm in width at the widest area. The long axis of each ellipse was oriented at an angle of 18 degrees to the machine direction (downweb). The ellipses were arranged with a center to center spacing of 12.1 cm. The elliptical depressions had a maximum depth of 0.80 mm around the entire ellipse and the sides of these depressions had a radius of 0.80 mm.

The rotation of the forming roll caused the doctor blade to wipe the molten polymer into these depressions while also allowing the formation of a base film layer (as shown in FIG. 17). After the wiping action of the doctor blade, the forming roll continued to rotate until the wiped polymer was forced into contact with a polypropylene nonwoven substrate (Product C0075 Style 3320 with a basis weight of 27 grams per square meter (gsm) from BBA Nonwovens) against a conformable backup roll (with a durometer of 75 Shore A) using a nip pressure of 14 pounds per lineal inch (25 Newtons/lineal cm).

A mechanical bond of the polymer in the elliptical depressions and the nonwoven substrate was achieved while no such bond was created between the base film and the substrate. The polymer, both that forming the base film and that forming the elliptical features released cleanly and essentially completely from the surface of the forming roll when the substrate was directed away from the forming roll. The thickness of the base film formed was 0.051 mm and the thickness of the elliptical regions (measuring both the substrate and the elliptical region) was 0.83 mm.

Example 2

A composite web was produced using a system similar to that shown in FIG. 15. A 40 mm diameter twin screw extruder fitted with a gear pump was used to deliver a molten polymer consisting of a styrene-ethylenebutylene-styrene block copolymer (KRATON G-1657) at a melt temperature of approximately 246° C. to a die. The die was positioned such that a film of molten polymer was extruded vertically downward into the interface region of a heated doctor blade and a cooled forming roll. The doctor blade was maintained at a temperature of 246° C. and the forming roll was maintained at a temperature of 30° C. by circulating cooled oil through the interior of the roll. The doctor blade was held against the forming roll with a pressure of 450 pounds per lineal inch (788 Newtons/lineal cm).

The exterior surface of the forming roll was machined using a computer controlled milling machine to have a series of six (6) different areas arranged around the periphery of the roll. Each of these areas included a series of cross-direction (CD) grooves (depressions) running in the cross-machine direction (parallel to the axis of the forming roll). Each of the six patterns had 30 CD grooves, each of which was 9 cm in length (in direction parallel to roll axis).

Among the six patterns, Area 1 was machined with CD grooves 1.241 mm wide, 0.2769 mm in depth and with center to center spacing between the grooves (measured in the machine-direction, i.e., perpendicular to the cross-direction grooves) of 4.033 mm. Area 2 included CD grooves 1.695 mm wide, 0.1727 mm in depth and with center to center spacing of 4.033 mm. Area 3 included CD grooves 1.645 mm wide, 0.2007 mm in depth, and with center to center spacing of 4.033 mm. Area 4 included CD grooves 1.531 mm wide, 0.2261 mm in depth, and with center to center spacing of 4.033 mm. Area 5 included CD grooves parallel to the roll axis 2.387 mm wide, 0.3023 mm in depth, and with center to center spacing of 4.033 mm. Area 6 included CD grooves 2.195 mm wide, 0.3531 mm in depth, and with center to center spacing of 4.033 mm.

In addition to the CD grooves formed in the roll, the doctor blade was machined to include fifteen (15) notches such that fifteen (15) strands of polymer were formed in the machine-direction (MD) on the exterior surface of the roll (as seen in FIG. 23). The notches were formed in the doctor blade as grooves (0.135 mm wide by 0.381 mm deep) with a center to center spacing measured in the cross-machine direction of 6.30 mm.

The polymer (KRATON G-1657) was transferred to a nonwoven polypropylene substrate (Product C0075 Style 3320 with a basis weight of 27 gsm from BBA Nonwovens) at a nip formed with a conformable backup roll (a steel core with a rubber cover having a durometer of 75 Shore A). The core of the backup roll was chilled by circulating water at a temperature of 5° C. The pressure exerted on the nip between the forming roll and the backup roll was 14 pounds per lineal inch (25 Newtons/lineal cm). The polymer in the grooves and on the surface of the roll released cleanly and essentially completely from the surface of the forming roll when the substrate was removed from the forming roll (as shown in FIG. 15).

The amount of polymer transferred within each of the six patterns showed different levels of penetration into the substrate. To illustrate this, the area of the resultant composite web that corresponded to the pattern of Area 3 exhibited a strong bond between the polymer and the substrate only in the areas where the MD strands (formed by the notched doctor blade) crossed the CD strands (formed by the polymer in the CD grooves). In these regions the polymer penetrated into the substrate and had encapsulated many of the fibers of the substrate. However, in the remainder of the polymer in the CD strands and the MD strands, i.e., the portions outside of the intersections, the polymer did not form a strong bond to the substrate. It appeared that there little or no penetration into the substrate by the polymer.

When a piece of the composite web corresponding to Area 3 was stretched in the CD direction (e.g. 100% elongation by hand) and released, the nonwoven substrate formed arcuate portions between the bond points that correspond to the intersections of the CD and MD strands as shown in FIG. 22. For the heavier patterns, such as Area 6 (in which the CD grooves were larger), the polymer penetrated the nonwoven substrate, encapsulating many of the fibers, over the entire length of the CD strands. When a piece of the web that corresponds to Area 6 was stretched in the CD direction and released, the substrate did not form arcuate portions as was seen in samples of the stretched composite web from Area 3. The composite web formed by each of the six patterns had good elasticity after an initial stretching and relaxation. For each of the six patterns, significant portions of the substrate between the CD strands and MD strands was substantially free of polymer, thus creating a highly breathable web (because the nonwoven substrate was itself highly breathable).

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated. Various modifications and alterations of this invention will become apparent to those skilled in the art without departing from the scope of this invention. It should be understood that this invention is not to be unduly limited to illustrative embodiments set forth herein.

The invention claimed is:

1. A composite web comprising:
   a substrate comprising a first major surface; and
   at least two polymeric structures of a thermoplastic composition attached to the first major surface of the substrate;
   wherein each polymeric structure of the at least two polymeric structures occupies an area of the first major surface of the substrate,
   wherein the area occupied by at least one polymeric structure of the at least two polymeric structures comprises a bonded area in which the thermoplastic composition of the polymeric structure is attached to the first major surface and at least one detached area in which the polymeric structure is not attached to the first major surface of the substrate, wherein, in the detached area, the at least one polymeric structure is cantilevered over and aligned with the first major surface of the substrate, and wherein the first major surface of the substrate comprises polymeric material with a melt processing temperature at or below a melt processing temperature of the thermoplastic composition of the at least two polymeric structures.

2. A composite web according to claim 1, wherein the detached area comprises a stem comprising a free end supported above the first major surface of the substrate, wherein the free end is adapted to engage fibers of a loop material.

3. A composite web according to claim 1, wherein the first major surface of the substrate comprises a porous first major surface, and wherein the thermoplastic composition of the at least two polymeric structures infiltrates the porous first major surface within the bonded area.

4. A composite web according to claim 1, wherein the first major surface of the substrate comprises a polymeric film with a melt processing temperature at or below a melt processing temperature of the thermoplastic composition of the at least two polymeric structures.

5. A composite web according to claim 1, wherein the first major surface of the substrate comprises polymeric fibers with a melt processing temperature at or below a melt processing temperature of the thermoplastic composition of the at least two polymeric structures.

6. A composite web according to claim 1, wherein the first major surface of the substrate comprises fibers, and further wherein at least a portion of at least some of the fibers are encapsulated in the thermoplastic composition within the bonded area.

7. A composite web according to claim 1, wherein the thermoplastic composition of the at least two polymeric structures comprises one or more elastomeric polymeric components such that the at least two polymeric structures exhibit elastic behavior.

8. A composite web according to claim 1, wherein at least one of the at least two polymeric structures comprises an upper surface facing away from the first major surface of the substrate, and wherein the upper surface comprises surface features formed thereon.

9. A composite web according to claim 1, wherein at least one of the at least two polymeric structures comprises an upper surface facing away from the first major surface of the substrate, and wherein the upper surface comprises stems protruding therefrom.

10. A composite web according to claim 1, wherein the detached area comprises a barb.

11. A composite web according to claim 1, wherein each of the detached areas comprises a stem comprising a free end supported above the first major surface of the substrate, wherein the free end is adapted to engage fibers of a loop material.

12. A composite web according to claim 1, wherein each of the detached areas comprises a barb.

13. A composite web according to claim 1, wherein the first major surface of the substrate comprises one or more raised portions and surrounding valleys, wherein the bonded area of the at least one of the at least two polymeric structures is attached to one of the one or more raised portions.

14. A closure system comprising:

a substrate comprising a first major surface and at least two polymeric structures of a thermoplastic composition attached to the first major surface of the substrate, wherein each polymeric structure of the at least two polymeric structures occupies an area of the first major surface of the substrate, wherein the area occupied by at least one polymeric structure of the at least two polymeric structures comprises a bonded area in which the thermoplastic composition of the polymeric structure is attached to the first major surface and at least one detached area in which the polymeric structure is not attached to the first major surface of the substrate, wherein, in the detached area, the at least one polymeric structure is cantilevered over and aligned with the first major surface of the substrate, and wherein the first major surface of the substrate comprises polymeric material with a melt processing temperature at or below a melt processing temperature of the thermoplastic composition of the at least two polymeric structures; and a complementary surface comprising one or more openings capable of receiving the detached areas of the one or more polymeric structures;

wherein in a closed configuration, the first major surface of the substrate faces the complementary surface, and further wherein the at least one detached area of the at least one polymeric structure is located within the one or more openings of the complementary surface such that movement of the complementary surface and the substrate relative to each other is restricted.

15. A closure system according to claim 14, wherein the one or more openings of the complementary surface comprise fiber loops.

16. A closure system according to claim 14, wherein the at least one detached area comprises a stem comprising a free end supported above the first major surface of the substrate, wherein the free end is located within one opening of the one or more openings of the complementary surface when the closure system is in the closed configuration.

17. A closure system according to claim 14, wherein the at least one detached area comprises a barb.

* * * * *

UNITED STATES PATENT AND TRADEMARK OFFICE
CERTIFICATE OF CORRECTION

PATENT NO. : 7,669,297 B2
APPLICATION NO. : 11/675133
DATED : March 2, 2010
INVENTOR(S) : Byron M Jackson It is certified that error appears in the above-identified patent and that said Letters Patent is hereby corrected as shown below:

Column 1
Line 4, in Specification, delete "APPLICATION" and insert -- APPLICATIONS --, therefor.

Column 8
Line 36, in Specification, delete "contain" and insert -- contains --, therefor.

Column 9
Line 65, in Specification, delete "33adepicts" and insert -- 33a depicts --, therefor.

Line 67, in Specification, delete "33 a" and insert -- 33a --, therefor.

Column 11
Line 38, in Specification, delete "the a" and insert -- the --, therefor.

Column 18
Line 39, in Specification, delete "25%" and insert -- 125% --, therefor.

Line 40, in Specification, delete "50%" and insert -- 150% --, therefor.

Line 59, in Specification, delete "333located" and insert -- 333 located --, therefor.

Column 19
Line 47-48, in Specification, delete "of the of the" and insert -- of the --, therefor.

Column 20
Line 30, in Specification, delete "3 14." and insert -- 314. --, therefor.

Column 22
Line 34, in Specification, delete "a an" and insert -- an --, therefor.

Column 27
Line 37, in Specification, delete "wiping." and insert -- wiping --, therefor.

Signed and Sealed this

Sixth Day of July, 2010

David J. Kappos
*Director of the United States Patent and Trademark Office*

Column 29
Line 12, in Specification, delete "914eincludes" and insert -- 914e includes --, therefor.

Line 31, in Specification, delete "Closure Element Systems" and insert -- Closure Elements and Systems --, therefor.

Column 35
Line 44, in Specification, delete "33bsupported" and insert -- 33b supported --, therefor.

UNITED STATES PATENT AND TRADEMARK OFFICE
CERTIFICATE OF CORRECTION

| | |
|---|---|
| PATENT NO. | : 7,669,297 B2 |
| APPLICATION NO. | : 11/675133 |
| DATED | : March 2, 2010 |
| INVENTOR(S) | : Byron M Jackson et al. |

It is certified that error appears in the above-identified patent and that said Letters Patent is hereby corrected as shown below:

Column 1
Line 4, in Specification, delete "APPLICATION" and insert -- APPLICATIONS --, therefor.

Column 8
Line 36, in Specification, delete "contain" and insert -- contains --, therefor.

Column 9
Line 65, in Specification, delete "33adepicts" and insert -- 33a depicts --, therefor.

Line 67, in Specification, delete "33 a" and insert -- 33a --, therefor.

Column 11
Line 38, in Specification, delete "the a" and insert -- the --, therefor.

Column 18
Line 39, in Specification, delete "25%" and insert -- 125% --, therefor.

Line 40, in Specification, delete "50%" and insert -- 150% --, therefor.

Line 59, in Specification, delete "333located" and insert -- 333 located --, therefor.

Column 19
Line 47-48, in Specification, delete "of the of the" and insert -- of the --, therefor.

Column 20
Line 30, in Specification, delete "3 14." and insert -- 314. --, therefor.

This certificate supersedes the Certificate of Correction issued July 6, 2010.

Signed and Sealed this
Thirtieth Day of October, 2012

David J. Kappos
*Director of the United States Patent and Trademark Office*

Column 22
Line 34, in Specification, delete "a an" and insert -- an --, therefor.

Column 27
Line 37, in Specification, delete "wiping." and insert -- wiping --, therefor.

Column 29
Line 12, in Specification, delete "914eincludes" and insert -- 914e includes --, therefor.

Line 31, in Specification, delete "Closure Element Systems" and insert -- Closure Elements and Systems --, therefor.

Column 35
Line 44, in Specification, delete "33bsupported" and insert -- 33b supported --, therefor.